United States Patent
Zhou et al.

(10) Patent No.: US 11,082,131 B2
(45) Date of Patent: Aug. 3, 2021

(54) OPTICAL SIGNAL TRANSMISSION SYSTEM AND OPTICAL SIGNAL TRANSMISSION METHOD

(71) Applicant: HUAWEI TECHNOLOGIES CO., LTD., Guangdong (CN)

(72) Inventors: Xu Zhou, Shenzhen (CN); Ning Deng, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/805,220

(22) Filed: Feb. 28, 2020

(65) Prior Publication Data
US 2020/0204263 A1    Jun. 25, 2020

Related U.S. Application Data

(63) Continuation of application No. PCT/CN2018/103313, filed on Aug. 30, 2018.

(30) Foreign Application Priority Data

Sep. 1, 2017 (CN) .......................... 201710781413.1

(51) Int. Cl.
*H04B 10/40* (2013.01)
*H04B 10/516* (2013.01)
(Continued)

(52) U.S. Cl.
CPC .......... *H04B 10/40* (2013.01); *H04B 10/516* (2013.01); *H04B 10/614* (2013.01); *H04B 10/64* (2013.01)

(58) Field of Classification Search
CPC .... H04B 10/40; H04B 10/516; H04B 10/614; H04B 10/64
See application file for complete search history.

(56) References Cited

U.S. PATENT DOCUMENTS

| 8,213,795 B2 | 7/2012 | Han et al. |
| 9,438,371 B2 | 9/2016 | Zamani et al. |

(Continued)

FOREIGN PATENT DOCUMENTS

| CN | 101938438 A | 1/2011 |
| CN | 102571208 A | 7/2012 |

(Continued)

OTHER PUBLICATIONS

Alamouti, "A simple transmit diversity technique for wireless communications", IEEE Journal on Select Areas in Communications vol. 16, No. 8, Oct. 1998, 8 pages.

(Continued)

*Primary Examiner* — Dzung D Tran
(74) *Attorney, Agent, or Firm* — Fish & Richardson P.C.

(57) ABSTRACT

Embodiments of the present invention disclose an optical signal transmission system and an optical signal transmission method. A specific solution is as follows: a first coherent transceiver is configured to: convert N channels of downlink data into N modulating signals, convert the N modulating signals into a first wavelength division multiplexing signal, and send the first wavelength division multiplexing signal to an optical transport unit; the optical transport unit is configured to: receive the first wavelength division multiplexing signal, convert the first wavelength division multiplexing signal into N second optical signals, and correspondingly send the N second optical signals to N second coherent transceivers; and one of the N second coherent transceivers is configured to: receive the N second optical signals, and process the N second optical signals to obtain information in downlink data carried in the N second optical signals.

20 Claims, 15 Drawing Sheets

(51) Int. Cl.
*H04B 10/61* (2013.01)
*H04B 10/64* (2013.01)

(56) References Cited

U.S. PATENT DOCUMENTS

| | | | |
|---|---|---|---|
| 2009/0235143 | A1 | 9/2009 | Djordjevic et al. |
| 2010/0021163 | A1 | 1/2010 | Shieh |
| 2011/0156874 | A1 | 6/2011 | Liu et al. |
| 2015/0333834 | A1* | 11/2015 | Liu .................. H04L 27/2697 398/66 |
| 2016/0020857 | A1 | 1/2016 | Jia et al. |
| 2016/0352419 | A1 | 12/2016 | Fonseka et al. |
| 2017/0126315 | A1 | 5/2017 | Saito et al. |
| 2017/0299901 | A1* | 10/2017 | Komatsu ................ H04B 10/50 |
| 2018/0198547 | A1* | 7/2018 | Mehrvar ................ H04B 10/25 |
| 2019/0181961 | A1* | 6/2019 | Itoh ..................... H04B 10/616 |
| 2019/0245618 | A1* | 8/2019 | Bruno ................ H04B 10/5165 |

FOREIGN PATENT DOCUMENTS

| | | |
|---|---|---|
| CN | 103401832 A | 11/2013 |
| CN | 103782530 A | 5/2014 |
| CN | 104092498 A | 10/2014 |
| CN | 104104417 A | 10/2014 |
| CN | 104301811 A | 1/2015 |
| CN | 104935384 A | 9/2015 |
| CN | 105282064 A | 1/2016 |
| CN | 105308867 A | 2/2016 |
| CN | 105842661 A | 8/2016 |
| CN | 105897413 A | 8/2016 |
| CN | 106357343 A | 1/2017 |
| CN | 107040311 A | 8/2017 |
| EP | 2512173 A1 | 10/2012 |
| JP | 2001108861 A | 4/2001 |
| WO | 2015079400 A1 | 6/2015 |

OTHER PUBLICATIONS

Extended European Search Report issued in European Application No. 18850409.6 dated Aug. 27, 2020, 11 pages.

Meron et al., "Use of space-time coding in coherent polarization-multiplexed systems suffering from polarization-dependent loss," Optics Letters, Optical Society of America, vol. 35, No. 21, Nov. 1, 2010, 3 pages.

Office Action issued in Chinese Application No. 201710781413.1 dated Jul. 1, 2020, 21 pages (With English Translation).

Sales et al., "UDWDM-PON Using Low-Cost Coherent Transceivers With Limited Tunability and Heuristic DWA", IEEE/OSA Journal of Optical Communications and Networking, Aug. 11, 2016, 18 pages.

Cano et al., "Field-Trial of Low-Cost Coherent UDWDM-PON with Real-Time Processing, Monitoring and EPON Coexistence", Sep. 18-22, 2016, 3 pages.

PCT International Search Report and Written Opinion in International Application No. PCT/CN2018/103,313, dated Nov. 23, 2018, 17 pages (With English Translation).

Jaouën et al., "Space-time codes for fiber communications: Coding gain and experimental validation," 8th International Symposium on Communication Systems, Networks and Digital Signal Processing (CSNDSP), Sep. 17, 2012, 5 pages.

Ming et al.,"560 Tbits Coherent Optical PDM DFT-s OFDM 32QAM Signal Transmission over 10 km Single-Mode 7 Core Fiber," Study on Optical Communications, Apr. 2017, 5 pages (with English Abstract).

Nakajima et al., "640 Gbits DWDM Transmission Over PCF Using Orthogonal Polarisation Channel Allocation," 33rd European Conference and Exhibition of Optical Communication, Jun. 1, 2011, 2 pages.

Office Action issued in Chinese Application No. 201710781413.1 dated Apr. 29, 2021, 5 pages.

Office Action issued in Chinese Application No. 201710781413.1 dated Feb. 24, 2021, 10 pages (with English translation).

* cited by examiner

OPTICAL SIGNAL TRANSMISSION SYSTEM AND OPTICAL SIGNAL TRANSMISSION METHOD

CROSS-REFERENCE TO RELATED APPLICATIONS

This application is a continuation of International Application No. PCT/CN2018/103313, filed on Aug. 30, 2018, which claims priority to Chinese Patent Application No. 201710781413.1, filed on Sep. 1, 2017. The disclosures of the aforementioned applications are hereby incorporated by reference in their entireties.

TECHNICAL FIELD

Embodiments of the present invention relate to the field of optical communications technologies, and in particular, to an optical signal transmission system and an optical signal transmission method.

BACKGROUND

With the rise of mobile internet and high-definition video services, traffic of a metro optical network increases exponentially, and a low latency and a high bandwidth gradually become urgent requirements for a next-generation metro optical network. In order to meet the requirements, an ultra-dense wavelength division multiplexing passive optical network (UDWDM-PON) becomes an important direction for research into the next-generation metro optical network.

FIG. 1A and FIG. 1B are a schematic architecture diagram of an existing UDWDM-PON. As shown in FIG. 1A and FIG. 1B, the network may include an optical line terminal (OLT), an optical combiner, an optical fiber, an optical splitter, and a plurality of optical network units (ONO). The OLT may include a plurality of optical transceiver groups, and each optical transceiver group includes an encoder, a differential quadrature phase shift keying (DQPSK) modulator, an adder, a digital-to-analog converter, and a coherent optical modulator. Each ONU may include a coherent optical receiver, a digital signal processing unit, and a decoder, and the coherent optical receiver may include a polarization beam splitter (PBS) and a 90° optical hybrid. In each transceiver group of the OLT, channelafter encoding and DQPSK modulation, a plurality of channels of data are combined into one signal by using the adder; digital-to-analog conversion and in-phase quadrature (IQ) modulation are performed on the combined signal to generate a plurality of ultra-dense sub-wavelength optical signals; optical signals generated by the plurality of transceiver groups are combined by the optical combiner, and then transmitted through the optical fiber; after receiving a combined optical signals, the optical splitter splits the received optical signal into a plurality of optical signals, and correspondingly sends the split optical signals to the ONU; the ONU receives the optical signals by using the coherent optical receiver, restores in-phase information and quadrature-phase information of the optical signals in each polarization state, and performs digital signal processing and decoding on the restored information to obtain data carried in the optical signals.

It can be learned front FIG. 1A and FIG. 1B that, conventional expensive coherent optical receivers are used at both ends of the existing UDWDM-PON. This results in a dramatic increase in overall system costs, and in particular, high costs on an ONU side make it difficult to apply the technology.

SUMMARY

Embodiments of the present invention provide an optical signal transmission system and an optical signal transmission method, to resolve a problem of relatively high device costs of an existing optical signal transmission system.

To achieve the foregoing objective, the following technical solutions are used in the embodiments of the present invention.

According to an aspect, an embodiment of the present invention provides an optical signal transmission system, including a first coherent transceiver, an optical transport unit, and N second coherent transceivers.

The first coherent transceiver is configured to convert N channels of downlink data into N modulating signals. The N modulating signals each have a different frequency, one of the N modulating signals includes a first sub-signal in a first polarization state and a second sub-signal in a second polarization state, the first polarization state is orthogonal to the second polarization state, and the first sub-signal and the second sub-signal carry all information included in downlink data corresponding to the modulating signal.

The first coherent transceiver is further configured to: convert the N modulating signals into a first wavelength division multiplexing signal, and send the first wavelength division multiplexing signal to the optical transport unit. The first wavelength division multiplexing signal includes N first optical signals, and the N first optical signals correspond to the N modulating signals.

The optical transport unit is configured to: receive the first wavelength division multiplexing signal sent by the first coherent transceiver, convert the first wavelength division multiplexing signal into N second optical signals through transmission processing, and correspondingly send the N second optical signals to the N second coherent transceivers; and The N second coherent transceivers are configured to: receive the N second optical signals sent by the optical transport unit, and process the N second optical signals to obtain information in downlink data carried in the N second optical signals. The $i^{th}$ second coherent transceiver is configured to process the $i^{th}$ second optical signal to obtain information in downlink data carried in the $i^{th}$ second optical signal, and i is an integer greater than or equal to 1 and less than or equal to N.

Compared with the prior art, in the optical signal transmission system provided in this embodiment of the present invention, a coherent transceiver at a central office end (for example, the second coherent transceiver) performs space-time block coding on downlink data. Coded downlink data is modulated into different polarization states, and a signal in each polarization state carries all information included in the downlink data. In this way, after a space-time coded signal is sent to a coherent transceiver at a peer end after coherent modulation, the coherent transceiver at the peer end can receive an optical signal in any polarization state, and perform coupling and digital signal processing on the optical signal to obtain information carried in the signal, with no need to design a polarization beam splitter at a coherent transceiver at a receive end, reducing design costs of the coherent transceiver at the receive end.

In a possible design, the first coherent transceiver includes:

N groups of processing units, configured to perform symbol modulation, space-time block coding, and frequency domain modulation on the N channels of downlink data, respectively, to generate the N modulating signals for output. The $i^{th}$ group of processing units are configured to perform symbol modulation, space-time block coding processing, and frequency domain modulation on the $i^{th}$ channel of downlink data, to generate the $i^{th}$ modulating signal for output.

In a possible design, the $i^{th}$ group of processing units include:

a symbol modulation unit, configured to perform symbol modulation on the $i^{th}$ channel of downlink data, to generate a signal including at least one symbol for output;

a space-time block coding unit, configured to perform polarized and time-dimensional space-time coding on the signal output by the symbol modulation unit, to generate a space-time coded signal for output; and a frequency domain modulation unit, configured to perform frequency domain modulation on the space-time coded signal output by the space-time block coding unit, to generate the $i^{th}$ modulating signal for Output.

In a possible design, the first coherent transceiver further includes:

a combiner unit, configured to combine the N modulating signals output by the N groups of processing units, to generate a combined signal for output;

a digital-to-analog converter, configured to perform digital-to-analog conversion on the combined signal output by the combiner unit, to generate an analog signal for output; and a coherent modulator, configured to perform, by using a first optical carrier, coherent modulation on the analog signal output by the digital-to-analog converter, to generate the first wavelength division multiplexing signal for output.

In this way, a plurality of channels of downlink data may be transmitted in a wavelength division multiplexing manner.

In a possible design, the $i^{th}$ second coherent transceiver includes:

a coupler, configured to couple local oscillator light to the $i^{th}$ second optical signal received by the $i^{th}$ second coherent transceiver, to generate at least one coupled optical signal for output;

an optical-to-electrical conversion component, configured to perform optical-to-electrical conversion on the at least one coupled optical signal output by the coupler, to generate at least one electrical signal for output; and a digital signal processing unit, configured to perform digital signal processing on the at least one electrical signal output by the optical-to-electrical conversion component, to obtain, through demodulation, the information in the downlink data carried in the second optical signal.

In this way, information carried in an optical signal may be obtained through demodulation at a receive end through coupling, optical-to-electrical conversion, and digital signal processing.

In a possible design, the coupler and the optical-to-electrical conversion component are as follows:

the coupler is a 2×1 coupler, and the optical-to-electrical conversion component includes one photoelectric detector;

the coupler is a 2×2 coupler, and the optical-to-electrical conversion component includes one balanced photoelectric detector or two photoelectric detectors;

the coupler is a 3×3 coupler, and the optical-to-electrical conversion component includes three photoelectric detectors; or the coupler is an asymmetric 3×3 coupler, and the optical-to-electrical conversion component includes two photoelectric detectors.

In this way, couplers and optical-to-electrical conversion components in different forms may be applied, to implement coupling and optical-to-electrical conversion on optical signals, improving deployment flexibility of the optical signal transmission system.

In a possible design, the $i^{th}$ second coherent transceiver further includes a local oscillator laser. The local oscillator laser is configured to generate the local oscillator light and serve as a light source of the $i^{th}$ second coherent transceiver, or the local oscillator light is generated by a local oscillator outside the second coherent transceiver.

In this way, the local oscillator light coupled to the optical signal may be generated in the foregoing two manners, improving deployment flexibility of the optical signal transmission system.

In a possible design, the optical transport unit includes an optical switching device, an optical power splitter, or an optical switching device and an optical power splitter. In other words, the optical transport unit may be the optical switching device, the optical power splitter, or the optical switching device and the optical power splitter.

In this way, the optical transport unit may be formed by using a component in an existing network, so that the optical transport unit is compatible with an existing optical transport unit, and deployment flexibility of the optical signal transmission system is improved.

In a possible design, in an inverse process of sending the downlink data, and the optical signal transmission system is further configured to send uplink data. Details are as follows:

The N second coherent transceivers are further configured to modulate N channels of uplink data, to generate N third optical signals for output. The $j^{th}$ third optical signal carries all information included in the $j^{th}$ channel of uplink data, and j is an integer greater than or equal to 1 and less than or equal to N.

The optical transport unit is further configured to: receive the N third optical signals sent by the N second coherent transceivers, and perform transmission processing on the N third optical signals, to generate a second wavelength division multiplexing signal for output. The second wavelength division multiplexing signal includes the N third optical signals, and the N third optical signals each have a different frequency.

The first coherent transceiver is further configured to: receive the second wavelength division multiplexing signal output by the optical transport unit, and obtain, through digital signal processing, information in uplink data carried in the N third optical signals.

In this way, the uplink data may be sent in a wavelength division multiplexing manner.

In a possible design, the $j^{th}$ second coherent transceiver in the N second coherent transceivers is specifically configured to modulate the light source of the $j^{th}$ second coherent transceiver with the $j^{th}$ channel of uplink data, to generate the $j^{th}$ third optical signal for output.

According to another aspect, an embodiment of the present invention provides an optical signal transmission method. The method is applied to an optical signal transmission system, the optical signal transmission system includes a first coherent transceiver, an optical transport unit, and N second coherent transceivers, and the method includes:

converting, by the first coherent transceiver, N channels of downlink data into N modulating signals, where the N modulating signals each have a different frequency, one of the N modulating signals includes a first sub-signal in a first polarization state and a second sub-signal in a second polarization state, the first polarization state is orthogonal to the second polarization state, and the first sub-signal and the second sub-signal carry all information included in downlink data corresponding to the modulating signal;

converting, by the first coherent transceiver, the N modulating signals into a first wavelength division multiplexing signal, and sending the first wavelength division multiplexing signal to the optical transport unit, where the first wavelength division multiplexing signal includes N first optical signals, and the N first optical signals correspond to the N modulating signals;

receiving, by the optical transport unit, the first wavelength division multiplexing signal sent by the first coherent transceiver, converting the first wavelength division multiplexing signal into N second optical signals through transmission processing, and correspondingly sending the N second optical signals to the N second coherent transceivers; and receiving, by the N second coherent transceivers, the N second optical signals sent by the optical transport unit, and processing the N second optical signals to obtain information in downlink data carried in the N second optical signals, where the $i^{th}$ second coherent transceiver processes the $i^{th}$ second optical signal to obtain information in downlink data carried in the $i^{th}$ second optical signal, and i is an integer greater than or equal to 1 and less than or equal to N.

For specific implementations of the processes in the optical signal transmission method, refer to actions and functions of the function components in the optical signal transmission system according to any one of the foregoing aspect or the possible designs of the foregoing aspect. Details are not described again. Therefore, the optical signal transmission method provided in this aspect can achieve the same beneficial effects as the foregoing aspect.

According to an aspect, an embodiment of the present invention provides an optical signal transmission system. The optical signal transmission system may implement the functions performed by the function components of the optical signal transmission system in the foregoing method embodiment. The functions may be implemented by hardware, or may be implemented by hardware by executing corresponding software. The hardware or the software includes one or more modules corresponding to the foregoing functions.

In a possible design, a structure of the optical signal transmission system includes a processor and a communications interface. The processor is configured to support the optical signal transmission system to perform the corresponding functions in the foregoing method. The communications interface is configured to support communication between the optical signal transmission system and another network element. The optical signal transmission system may further include a memory. The memory is configured to be coupled to the processor and store a program instruction and data that are necessary for the optical signal transmission system.

According to an aspect, an embodiment of the present invention provides a computer storage medium, configured to store a computer software instruction used by the foregoing optical signal transmission system. The computer software instruction includes a program used to perform the method described in the foregoing aspect, According to an aspect, an embodiment of the present invention provides a computer program product. The program product stores a computer software instruction used by the foregoing optical signal transmission system. The computer software instruction includes a program used to perform the method described in the foregoing aspect.

According to an aspect, an embodiment of the present invention provides an apparatus. The apparatus exists in a product form of a chip. A structure of the apparatus includes a processor and a memory. The memory is configured to be coupled to the processor and store a program instruction and data that are necessary for the apparatus. The processor is configured to execute the program instruction stored in the memory, so that the apparatus performs the functions corresponding to the optical signal transmission system in the foregoing method.

BRIEF DESCRIPTION OF THE DRAWINGS

FIG. 3a-1 and FIG. 3a-2 are a schematic composition diagram of still another optical signal transmission system according to an embodiment of the present invention;

FIG. 3b-1 and FIG. 3b-2 are a schematic composition diagram of yet another optical signal transmission system according to an embodiment of the present invention;

DESCRIPTION OF EMBODIMENTS

The following describes in detail implementations of the embodiments of the present invention with reference to accompanying drawings.

Figure 1A:
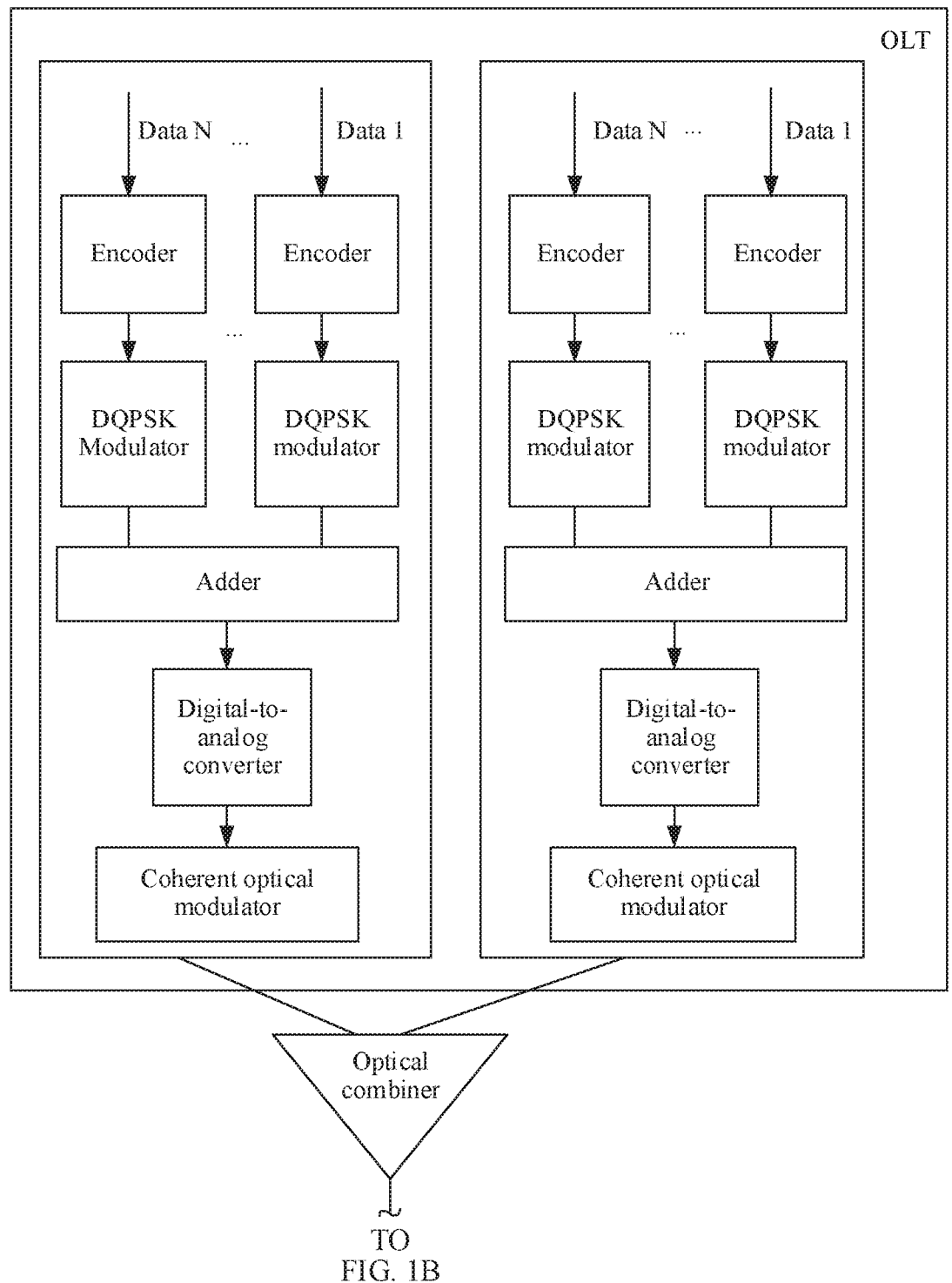
FIG. 1A and FIG. 1B are a schematic architecture diagram of an existing UDWDM-PON.
Figure 1B:
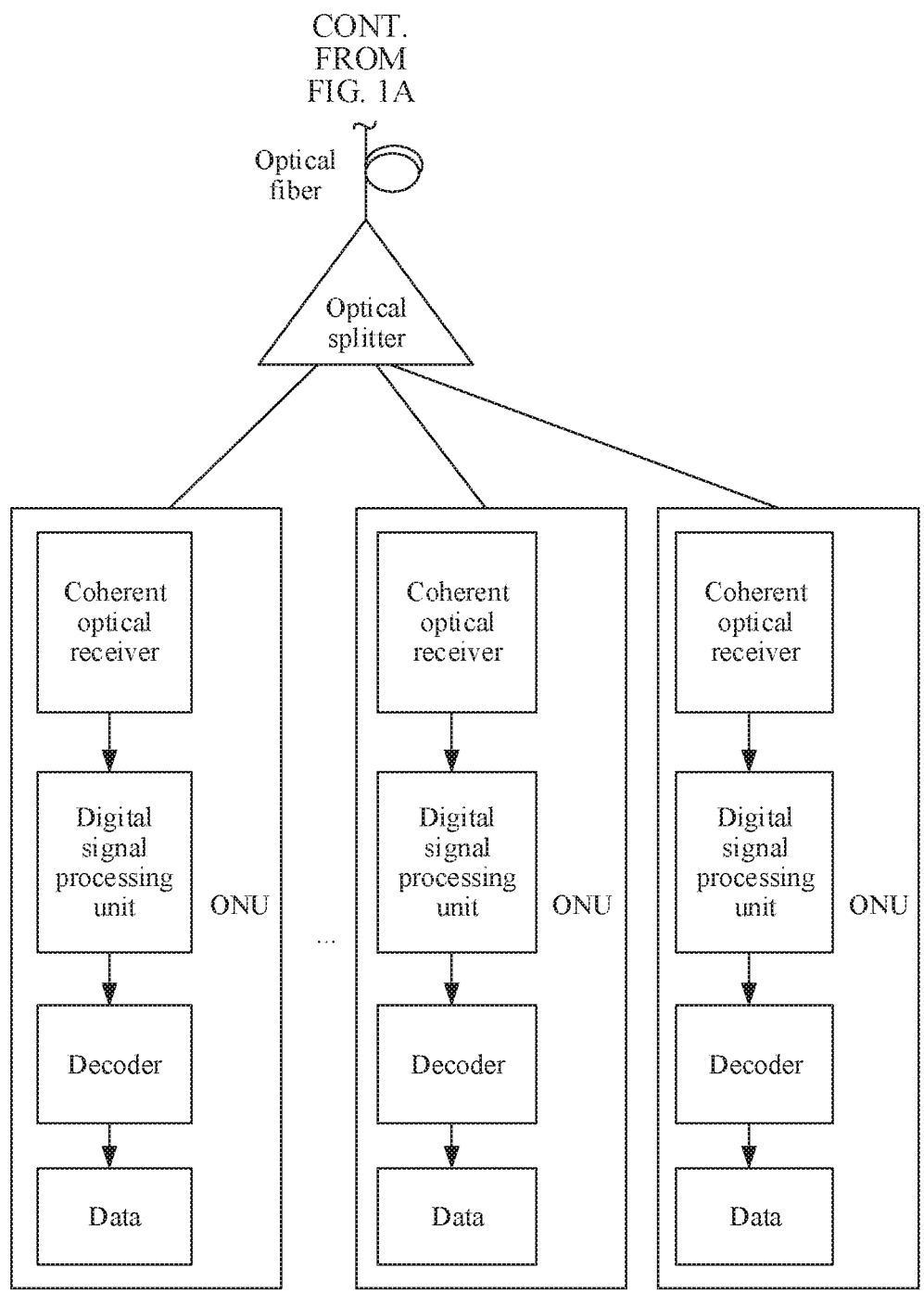
Figure 2A:
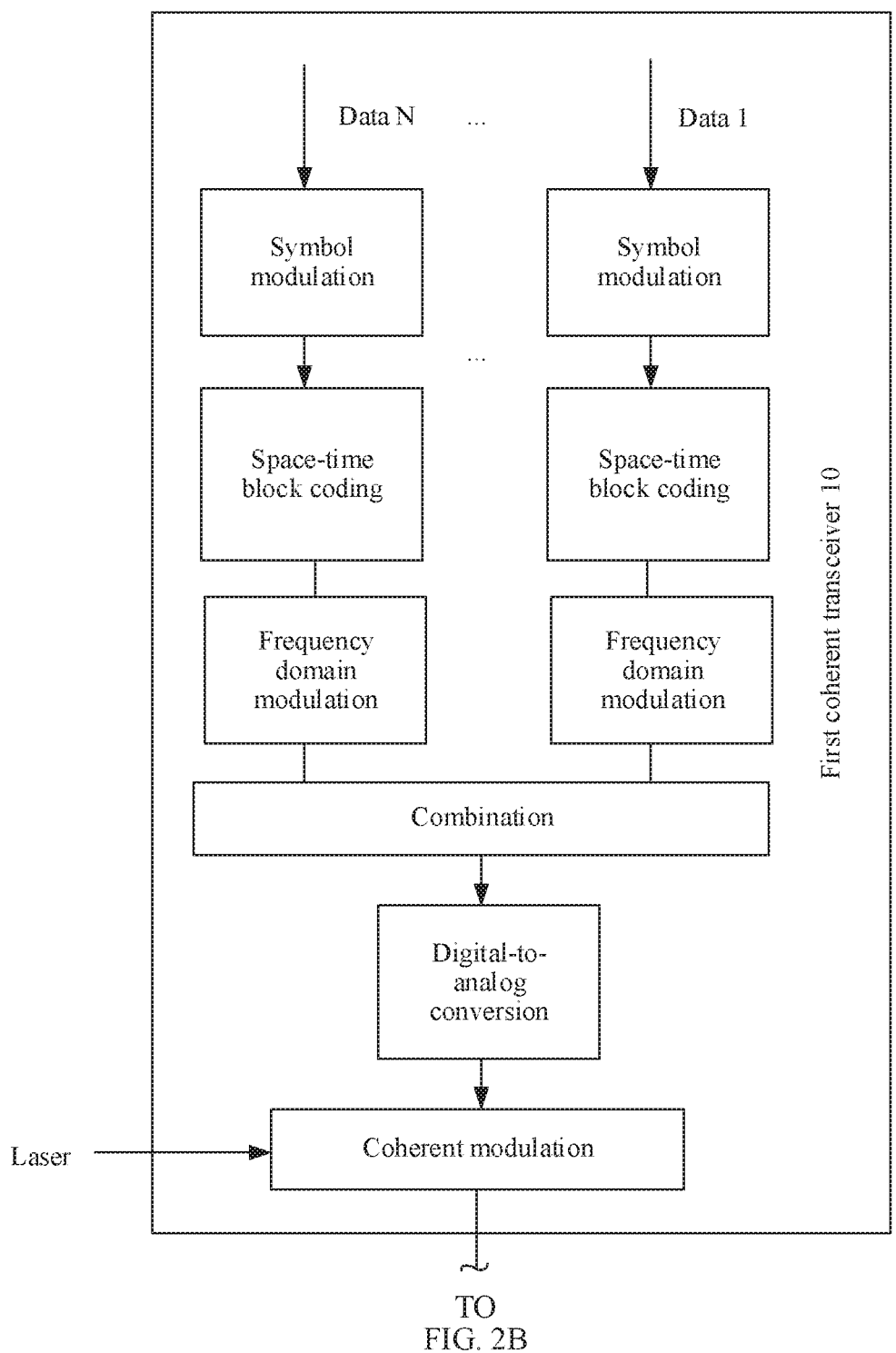
FIG. 2A and FIG. 2B are a schematic composition diagram of an optical signal transmission system according to an embodiment of the present invention.
Figure 2B:
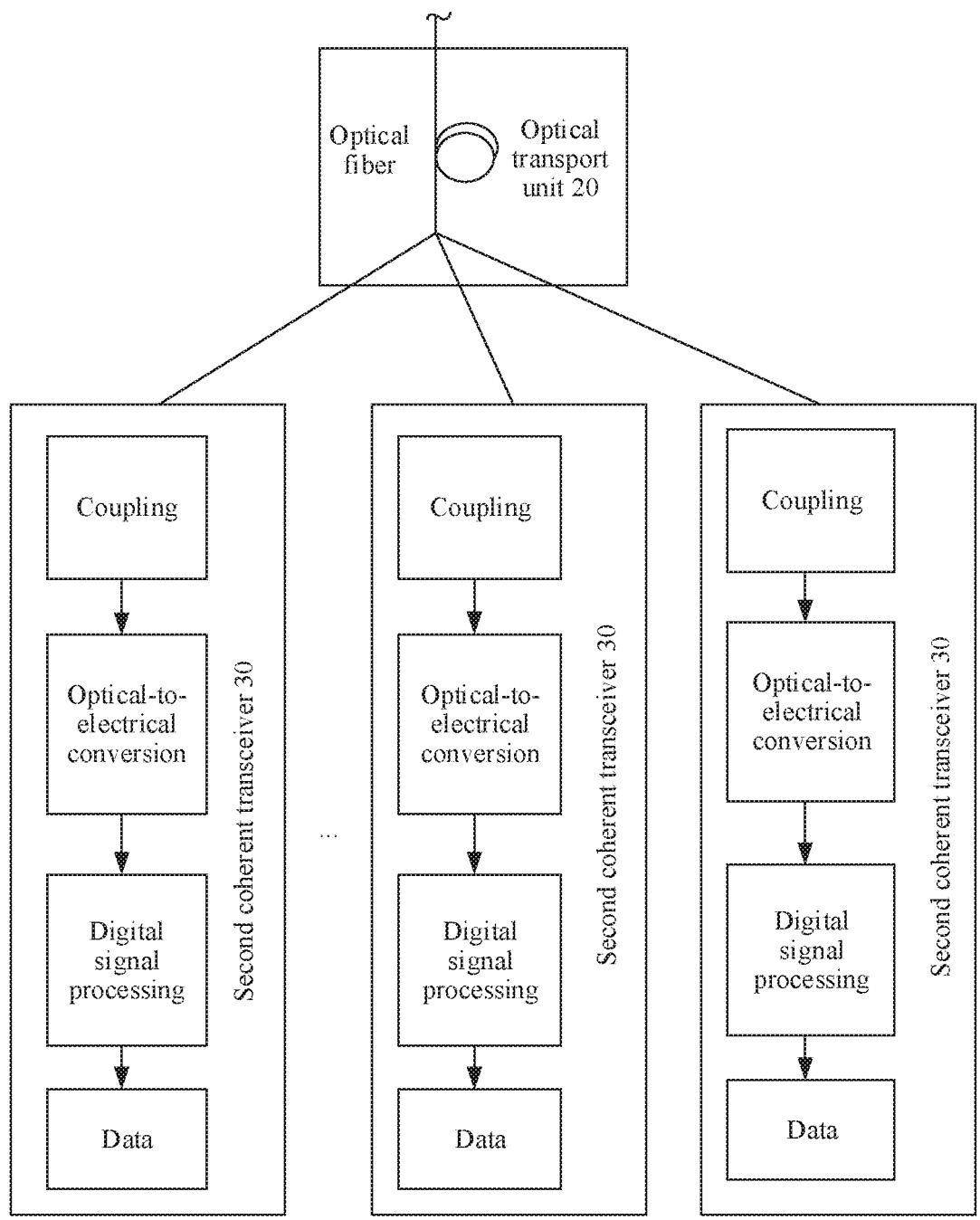

FIG. 2A and FIG. 2B are a schematic composition diagram of an optical signal transmission system according to an embodiment of the present invention. As shown in FIG. 2A and FIG. 2B, the optical signal transmission system may include a first coherent transceiver 10, an optical transport unit 20, and N second coherent transceivers 30. The first coherent transceiver 10 may be connected to the optical transport unit 20, and the optical transport unit 20 may be connected to the N second coherent transceivers 30, where N is an integer greater than or equal to 2.

The first coherent transceiver 10 in FIG. 2A and FIG. 29 may be located on a core node, for example, may be an OLT located on a convergence node in a metropolitan area network. The first coherent transceiver 10 may be configured to: obtain N channels of downlink data, and convert the N channels of downlink data into N modulating signals, where the N modulating signals each have a different frequency, one of the N modulating signals includes a first sub-signal in a first polarization state and a second sub-signal in a second polarization state, the first polarization state is orthogonal to the second polarization state, and the first sub-signal and the second sub-signal carry all information included in downlink data corresponding to the modulating signal; and convert the N modulating signals into a first wavelength division multiplexing signal, and send the first wavelength division multiplexing signal to the optical transport unit 20, where the first wavelength division multiplexing signal includes N first optical signals, the N first optical signals correspond to the N modulating signals, and the first optical signals are obtained by performing digital-to-analog conversion and coherent modulation on the modulating signals.

The optical transport unit 20 in FIG. 2A and FIG. 2B may be an optical distribution network (optical distribution network, ODN), and functions to provide an optical transmission channel for the first coherent transceiver 10 and the N second coherent transceivers 30. The optical transport unit 20 may be configured to branch/couple or multiplex/demultiplex a wavelength division multiplexing signal. For example, the optical transport unit 20 may be configured to: receive the first wavelength division multiplexing signal sent by the first coherent transceiver 10, convert the first wavelength division multiplexing signal into N second optical signals through transmission processing, and correspondingly send the N second optical signals to the N second coherent transceivers 30.

For example, the optical transport unit 20 sends the $1^{st}$ second optical signal to the $1^{st}$ second coherent transceiver 30, and sends the $2^{nd}$ second optical signal to the $2^{nd}$ second coherent transceiver 30. A similar process is performed, until the optical transport unit 20 sends the $N^{th}$ second optical signal to the $N^{th}$ coherent transceiver. It should be noted that, when sending the N second optical signals to the N second coherent transceivers 30, the optical transport unit 20 may send the second optical signals simultaneously or within different time units (for example, slots). This is not limited.

Each second coherent transceiver 30 in FIG. 2A and FIG. 2B may be located on an access node, and is a coherent transceiver at a user end. For example, the second coherent transceiver 30 may be an ONU. The N second coherent transceivers 30 are configured to: receive the N second optical signals sent by the optical transport unit 20, and process the N second optical signals to obtain information in downlink data carried in the N second optical signals. The $i^{th}$ second coherent transceiver is configured to process the $i^{th}$ second optical signal to obtain information in downlink data carried in the $i^{th}$ second optical signal, and i is an integer greater than or equal to 1 and less than or equal to N.

It should be noted that, FIG. 2A and FIG. 2B is merely an example of an architecture diagram. In addition to the components shown in FIG. 2A and FIG. 2B, the optical signal transmission system may include other components. This is not limited in this embodiment of the present invention.

In a conventional optical signal transmission system, an OLT transmits, to an optical transport unit, a wavelength division multiplexing signal that is obtained through coherent modulation and that includes a plurality of optical signals, and the optical transport unit converts the received wavelength division multiplexing signal into the plurality of optical signals through processing, and correspondingly sends the plurality of optical signals to an ONU at a user end. Because optical signals are easily transmitted in different polarization states due to an optical transmission characteristic, the ONU needs to receive the optical signals in the different polarization states by using a polarization beam splitter, to completely obtain, through demodulation, information carried in the optical signals. In other words, the polarization beam splitter needs to be designed at the ONU, resulting in increased ONU design costs.

By comparison, in the optical signal transmission system according to this embodiment of the present invention, a coherent transceiver at a central office end performs space-time block coding on downlink data. Coded downlink data is modulated into different polarization states, and a signal in each polarization state carries all information included in the downlink data. In this way, after a space-time coded signal is sent to a coherent transceiver at a peer end after coherent modulation, the coherent transceiver at the peer end can receive an optical signal in any polarization state, and perform coupling and digital signal processing on the optical signal to obtain information carried in the signal, with no need to design a polarization beam splitter at a coherent transceiver at a receive end, reducing design costs of the coherent transceiver at the receive end.

Figure 3A:
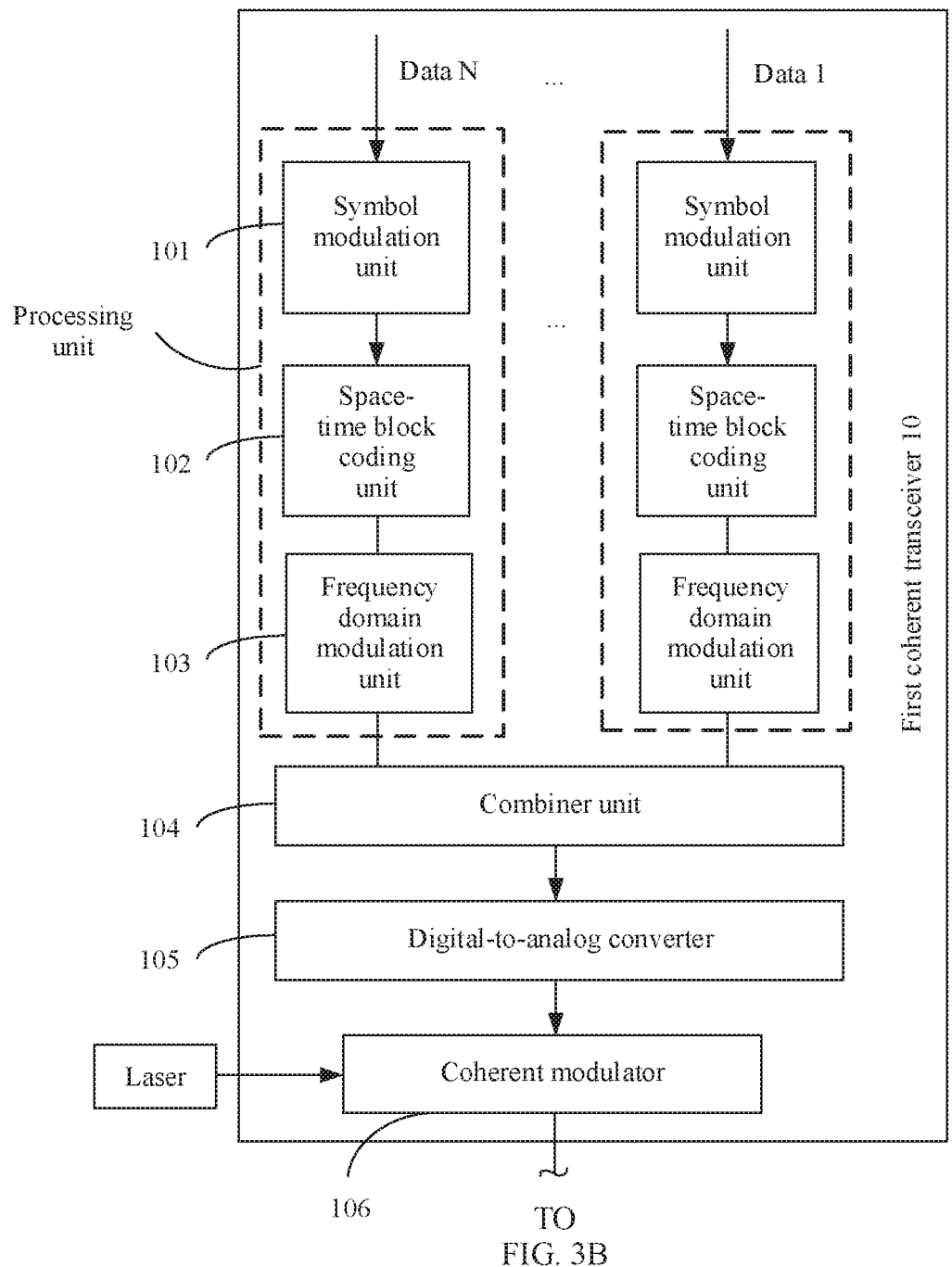
FIG. 3A and FIG. 3B are a schematic composition diagram of an optical signal transmission system according to an embodiment of the present invention.
Figure 3B:
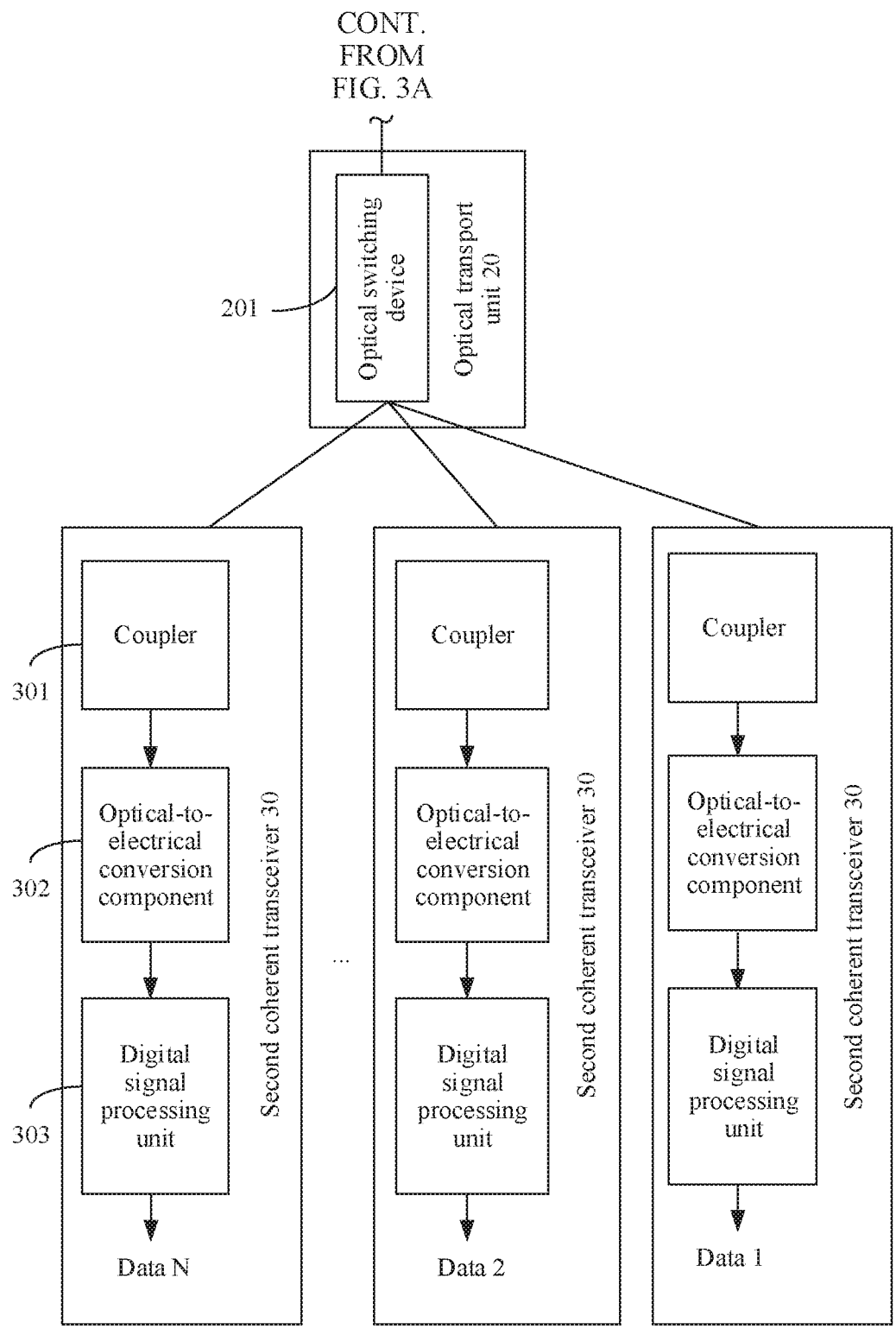

Specifically, as shown in FIG. 3A and FIG. 3B, the first coherent transceiver 10 may include N groups of processing units, a combiner (summing) unit 104, a digital-to-analog converter 105, and a coherent modulator 106.

The N groups of processing units correspond to the N channels of downlink data. The N groups of processing units are configured to perform symbol modulation, space-time block coding, and frequency domain modulation on the N channels of downlink data, respectively, to generate the N modulating signals for output. The group of processing units are configured to perform symbol modulation, space-time block coding processing, and frequency domain modulation on the channel of downlink data, to generate the $i^{th}$ modulating signal for output.

The $i^{th}$ group of processing units include a symbol modulation unit 101, a space-time block coding unit 102, and a frequency domain modulation unit 103.

The symbol modulation unit 101 may perform symbol modulation on the $i^{th}$ channel of downlink data, to generate a signal including at least one symbol for output.

The downlink data may be a digital baseband signal, that is, a signal whose center frequency is 0 and on which frequency domain modulation and frequency shift are not performed. Optionally, the first coherent transceiver 10 may obtain the N channels of downlink data from a signal source (for example, a base station).

The performing symbol modulation on the downlink data may include performing at least one of amplitude modulation, frequency modulation, and phase modulation on the downlink data, so that information included in the downlink data is carried in a signal with a higher frequency (for example, a signal with a frequency of 0 is modulated into a signal of 0 GHz to 5 GHz). For example, the downlink data may be modulated in any one of the existing modulation schemes such as orthogonal frequency division multiplexing (orthogonal frequency division multiplexing, OFDM) modulation and quadrature phase shift keying (quadrature phase shift keying, QPSK) modulation. For a specific modulation process of the downlink data, refer to the prior art. Details are not described herein.

For example, if the downlink data is S1, a signal obtained through frequency modulation and phase modulation by the symbol modulation unit 101 is $S_1(t)$: $S_1(t)=A_{s1} \exp^{(jw_{s1}t+j\theta_{s1})}$, where $A_{s1}$ is an amplitude of $S_1(t)$, $w_{s1}$ is a frequency of $S_1(t)$, and $\theta_{s1}$ is a phase of $S_1(t)$; and the signal includes at least one symbol.

The space-time block coding unit 102 may be configured to perform polarized and time-dimensional space-time coding on the signal output by the symbol modulation unit 101, to generate a space-time coded signal for output.

The polarized and time-dimensional space-time coding may be encoding the at least one symbol in two mutually orthogonal polarization states separately within a same time unit, for example, within the same time unit, encoding all symbols in the first polarization state, and encoding all symbols included in a modulating signal in the second polarization state. In other words, signal in each polarization state carries all information included in the downlink data, and different symbols occupy different time units in each polarization state.

The first polarization state is orthogonal to the second polarization state. For example, the first polarization state may be a transverse electric mode (transverse electric mode, TE), and the second polarization state may be a transverse magnetic mode (transverse magnetic mode, TM). The time unit may be a slot (slot), a time interval, or the like.

Specifically, the space-time block coding unit 102 may perform polarized and time-dimensional space-time coding on the modulating signal by using an existing space-time coding technology. Details are not described herein.

Figure 4A:
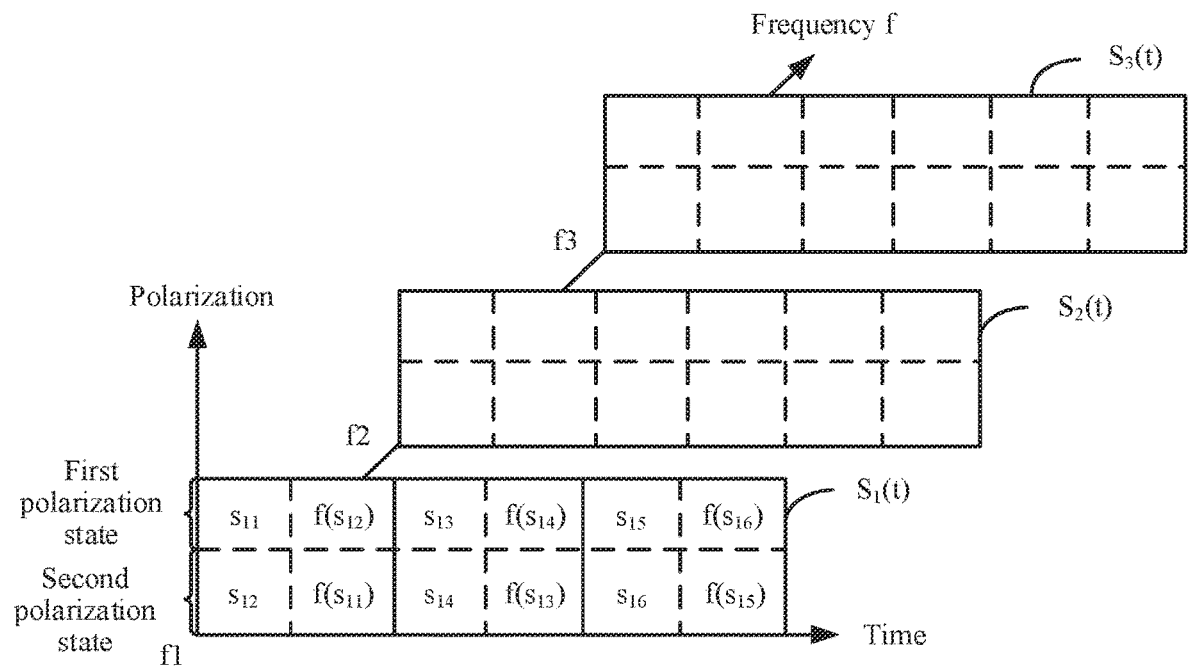
FIG. 4a is a schematic diagram of space-time-frequency coding according to an embodiment of the present invention.

For example, as shown in FIG. 4*a*, the modulating signal $S_1(t)$ includes six modulated symbols: $s_{11}$, $s_{12}$, $s_{13}$, $s_{14}$, $s_{15}$, and $s_{16}$. The original symbols $s_{11}$, $s_{13}$, and $s_{15}$, and functions $\theta(s_{12})$, $\theta(s_{14})$, and $\theta(s_{16})$ of $s_{12}$, $s_{14}$, and $s_{16}$ may be encoded into the first polarization state, and the original modulated symbols $s_{12}$, $s_{14}$, and $s_{16}$, and functions $f(s_{11})$, and $f(s_{13})$, and $f(s_{15})$ of $s_{11}$, $s_{13}$, and $s_{15}$ may be encoded into the second polarization state.

In this way, the space-time coded signal obtained through polarized and time-dimensional space-time coding by the space-time block coding unit 102 may include a first space-time coded signal in the first polarization state and a second space-time coded signal in the second polarization state.

The frequency domain modulation unit 103 may be configured to perform frequency domain modulation on the space-time coded signal output by the space-time block coding unit 102, to generate the $i^{th}$ modulating signal for output.

The modulating signal may include a first sub-signal in the first polarization state and a second sub-signal in the second polarization state.

The performing frequency domain modulation on the space-time coded signal may be modulating the space-time coded signal by using a carrier with a higher frequency (for example, a carrier whose frequency is greater than a frequency of the space-time coded signal), so that the space-time coded signal is shifted to a higher frequency. Specifically, for a frequency domain modulation scheme of the space-time coded signal, refer to the prior art. Details are not described herein.

For example, the signal $S_1(t)=A_{s1} \exp^{(jw_{s1}t+j\theta_{s1})}$ is converted into $S_1(t)=A_{s1} \exp^{(ju'_{s1}t+j\theta_{s1})}$ through frequency domain modulation, where a frequency changes from $w_{s1}$ to $w'_{s1}$.

In addition, in this embodiment of the present invention, modulating signals output by the frequency domain modulation units 103 in different processing units each have a different frequency, to ensure that the signals are transmitted through independent frequency channels. For example, as shown in FIG. 4*a*, after space-time block coding, the modulating signals $S_1(t)$, $S_2(t)$, and $S_3(t)$ are modulated into frequencies f1, f2, and f3 in frequency domain, respectively.

The combiner unit 104 may be configured to combine the N modulating signals output by the N groups of processing units, to generate a combined signal for output.

Figure 4B:
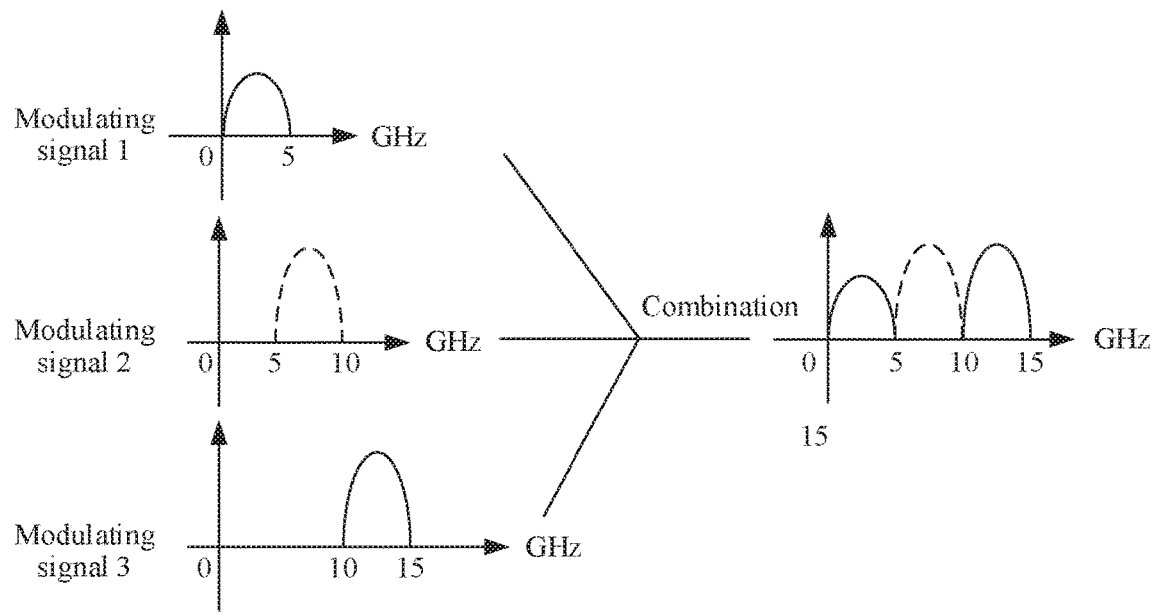
FIG. 4b is a schematic diagram of signal combining according to an embodiment of the present invention.

The combining the modulating signals may be adding the N modulating signals together to obtain an electrical-domain frequency division multiplexing signal for transmission. Moreover, the modulating signals occupy different frequencies and do not interfere with each other. That is, the combined signal includes the N modulating signals. As shown in FIG. 4*b*, a modulating signal 1 of 0 GHz to 5 GHz, a modulating signal 2 of 5 GHz to 10 GHz, and a modulating signal 3 of 10 GHz to 15 GHz are combined into a combined signal of 0 GHz to 15 GHz, where frequency separations between the modulating signals 1, 2, and 3 may be set as required. Specifically, for a combining process of the modulating signals, refer to the prior art. Details are not described herein.

For example, if the $1^{st}$ modulating signal is $S_1(t)=A_{s1} \exp^{(jw'_{s1}t+j\theta_{s1})}$, and the $2^{nd}$ modulating signal is $S_2(t)=A_{s2} \exp^{(jw'_{s2}t+j\theta_{s2})}$, a combined signal generated by combining the $1^{st}$ modulating signal and the $2^{nd}$ modulating signal is: $S(t)=A_{s1} \exp^{(jw'_{s1}t+j\theta_{s1})}+A_{s2} \exp^{(jw'_{s2}t+j\theta_{s2})}$.

The digital-to-analog (digital to analog, DA) converter 105 may be configured to perform digital-to-analog conversion on the combined signal output by the combiner unit 104, to generate an analog signal for output.

Digital-to-analog conversion may be converting a digital signal with continuous amplitudes into an analog signal with continuous amplitudes. Specifically, for a digital-to-analog conversion process of the combined signal, refer to the prior art. Details are not described herein.

For example, the combined signal $S(t)=A_{s1} \exp^{(jw'_{s1}t+j\theta_{s1})}+A_{s2} \exp^{(jw'_{s2}t+j\theta_{s2})}$ changes to $S(t)=A_s(t)(\exp^{(jw'_{s1}t+j\theta_{s1})}+\exp^{(jw'_{s2}t-j\theta_{s2})})$ through digital-to-analog conversion.

The coherent modulator 106 may be configured to perform, by using a first optical carrier, coherent modulation on the analog signal output by the digital-to-analog converter, to generate the first wavelength division multiplexing signal for output.

Coherent modulation may be: multiplying the first optical carrier by the analog signal, and modulating the analog signal onto an optical spectrum with a higher frequency (for example, onto an optical carrier of THz). For example, if a frequency of the analog signal is 100 GHz, and a frequency of the first optical carrier is 194 THz, a frequency obtained by multiplying the first optical carrier by the analog signal is 193.95 THz to 194.05 THz. Specifically, for the coherent modulation process, refer to the prior art. Details are not described herein.

The first optical carrier may be coherent light with a narrow spectral line, a stable frequency, and a constant phase, and may be generated by an external cavity laser (external cavity laser, ECL) shown in FIG. 3A and FIG. 3B.

The first wavelength division multiplexing signal may include N first optical signals, the N first optical signals may correspond to the N modulating signals, and each optical signal is obtained by performing digital-to-analog conversion and coherent modulation on a modulating signal.

For example, the analog signal in the first polarization state $S(t)=A_s(t)(\exp^{jw'_{s1}t+j\theta_{s1}}+\exp^{jw'_{s2}t+j\theta_{s2}})$ changes to a wavelength division multiplexing signal through coherent modulation.

Specifically, as shown in FIG. 3A and FIG. 33, the optical transport unit 20 may include an optical switching device 201.

The optical switching device 201 is a switching device having ultra-narrow optical channel switching and forwarding capabilities, and may be a wavelength division multiplexer/demultiplexer, a wavelength selective switch (wavelength selective switch, WSS), an optical filter, or the like.

The optical switching device 201 may be configured to select, based on different wavelengths of an optical wave, optical signals included in the wavelength division multiplexing signal, that is, to split the first wavelength division multiplexing signals into the N second optical signals. The N second optical signals may correspond to the N first optical signals. Optionally, the N second optical signals are the N first optical signals.

For example, two second optical signals $S_1(T)=A_{s1}(t)\exp^{(jw''_{s1}t+j\theta_{s1})}$ and $S_2(t)=A_{s2}(t)\exp^{(jw''_{s2}t+j\theta_{s2})}$ may be obtained after the wavelength division multiplexing signal $S(t)=A_s(t)(\exp^{(jw''_{s1}1+j\theta_{s1})}+\exp^{(jw'_{s2}j\theta_{s2})})$ passes through the optical switching device 201. Specifically, for a working principle and an implementation process of the optical switching device 201, refer to the prior art. Details are not described herein.

Figures 1, 3A:
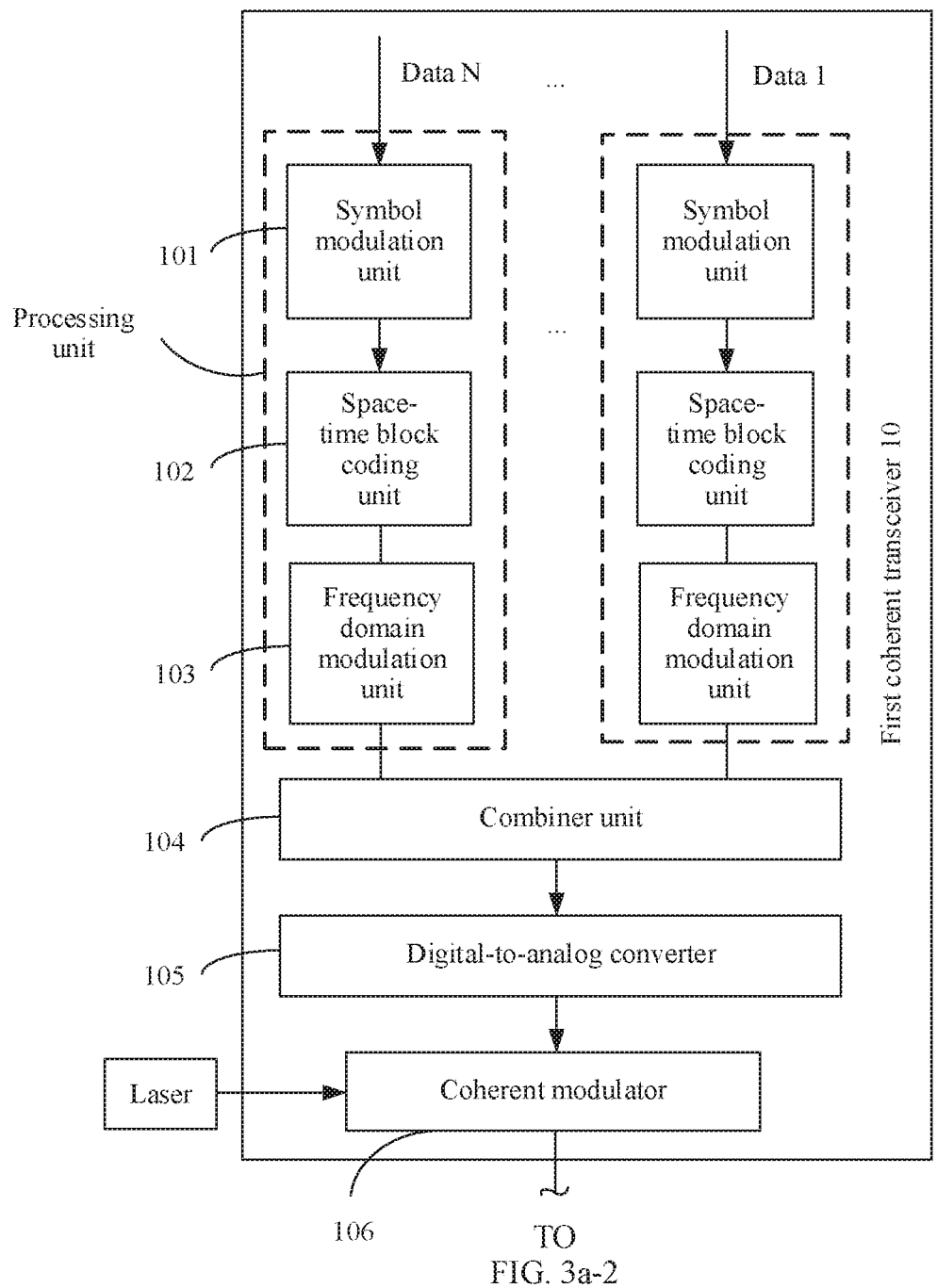
Figures 2, 3A:
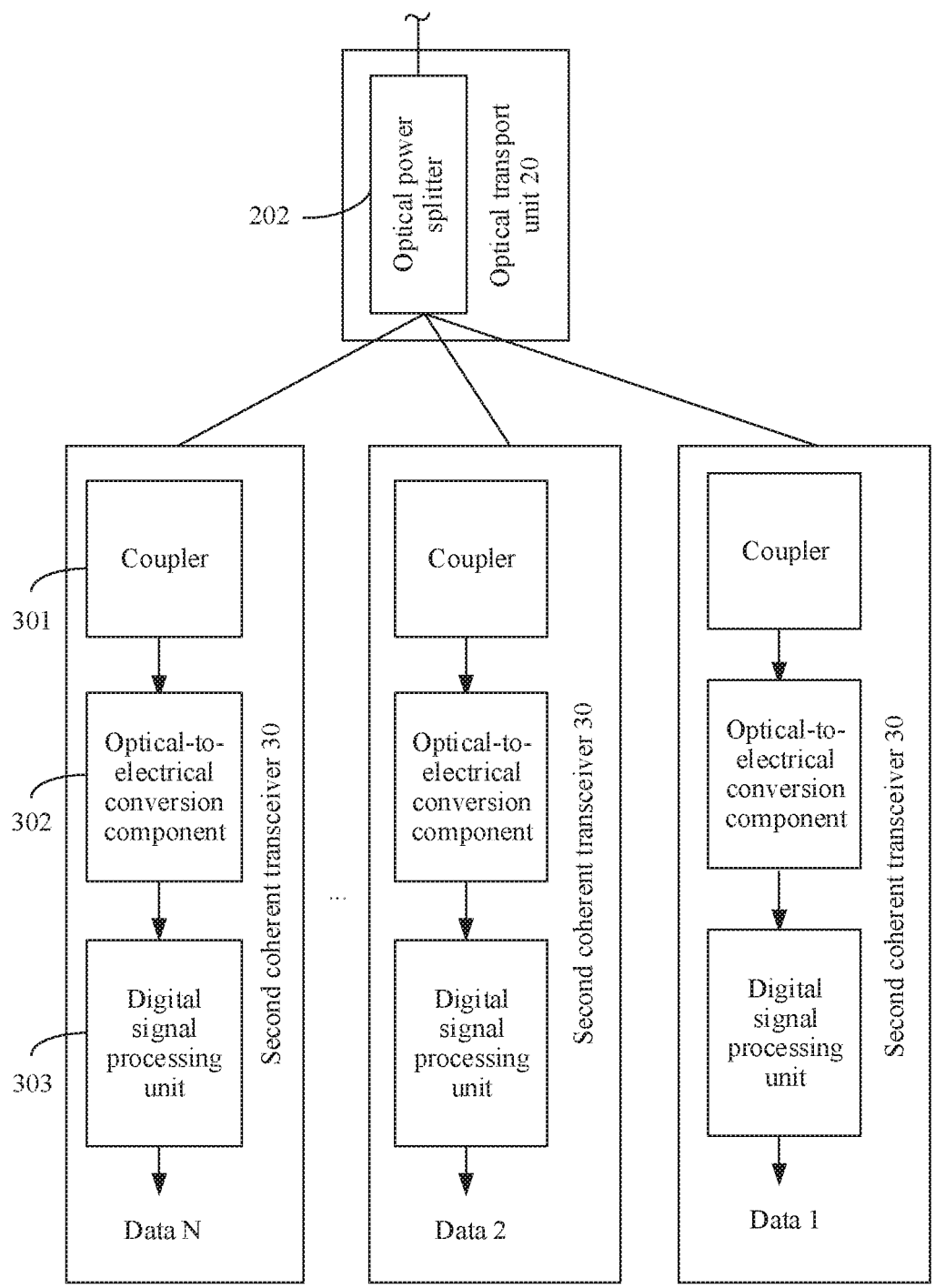
Figures 1, 3B:
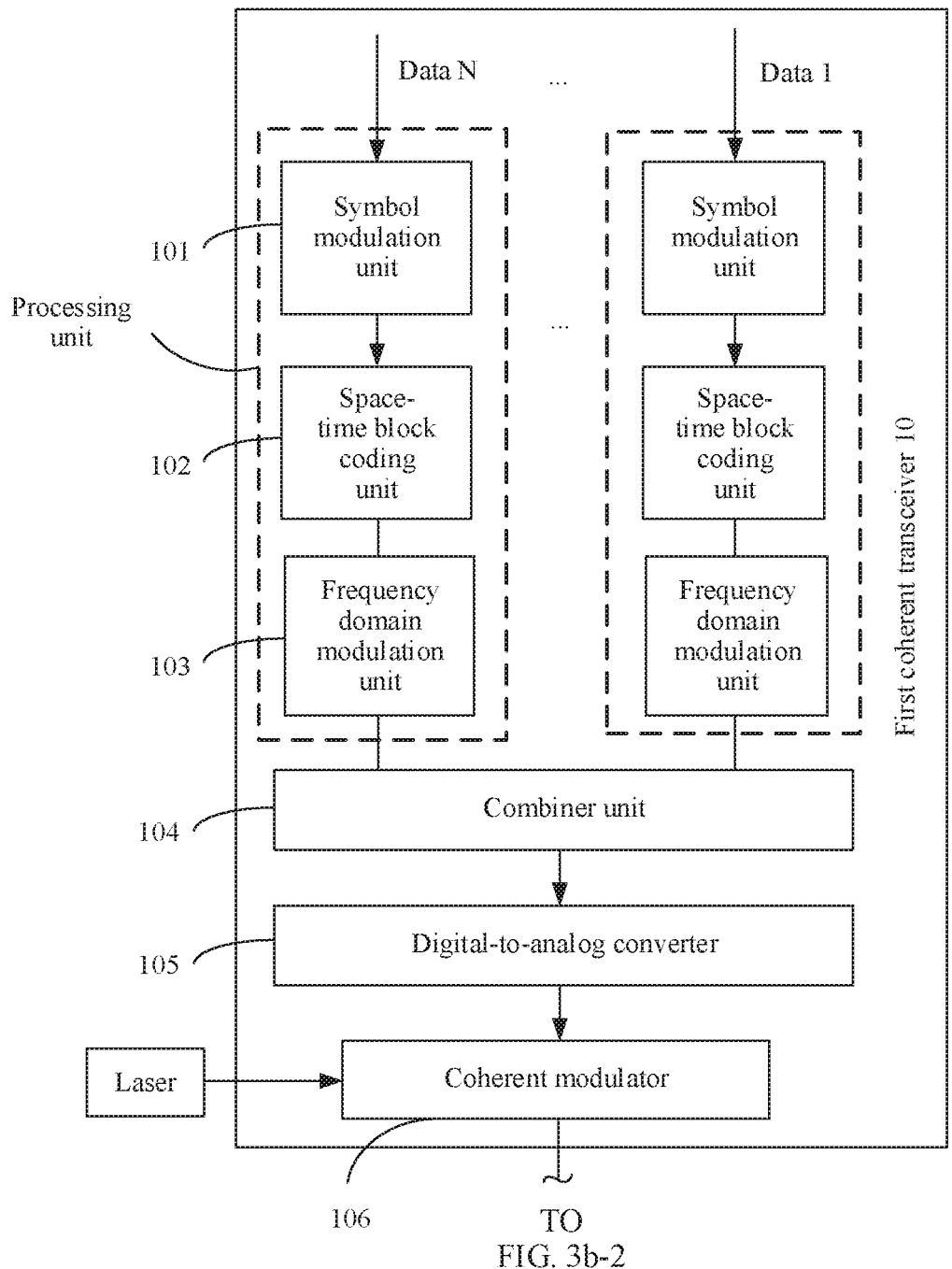
Figures 2, 3B:
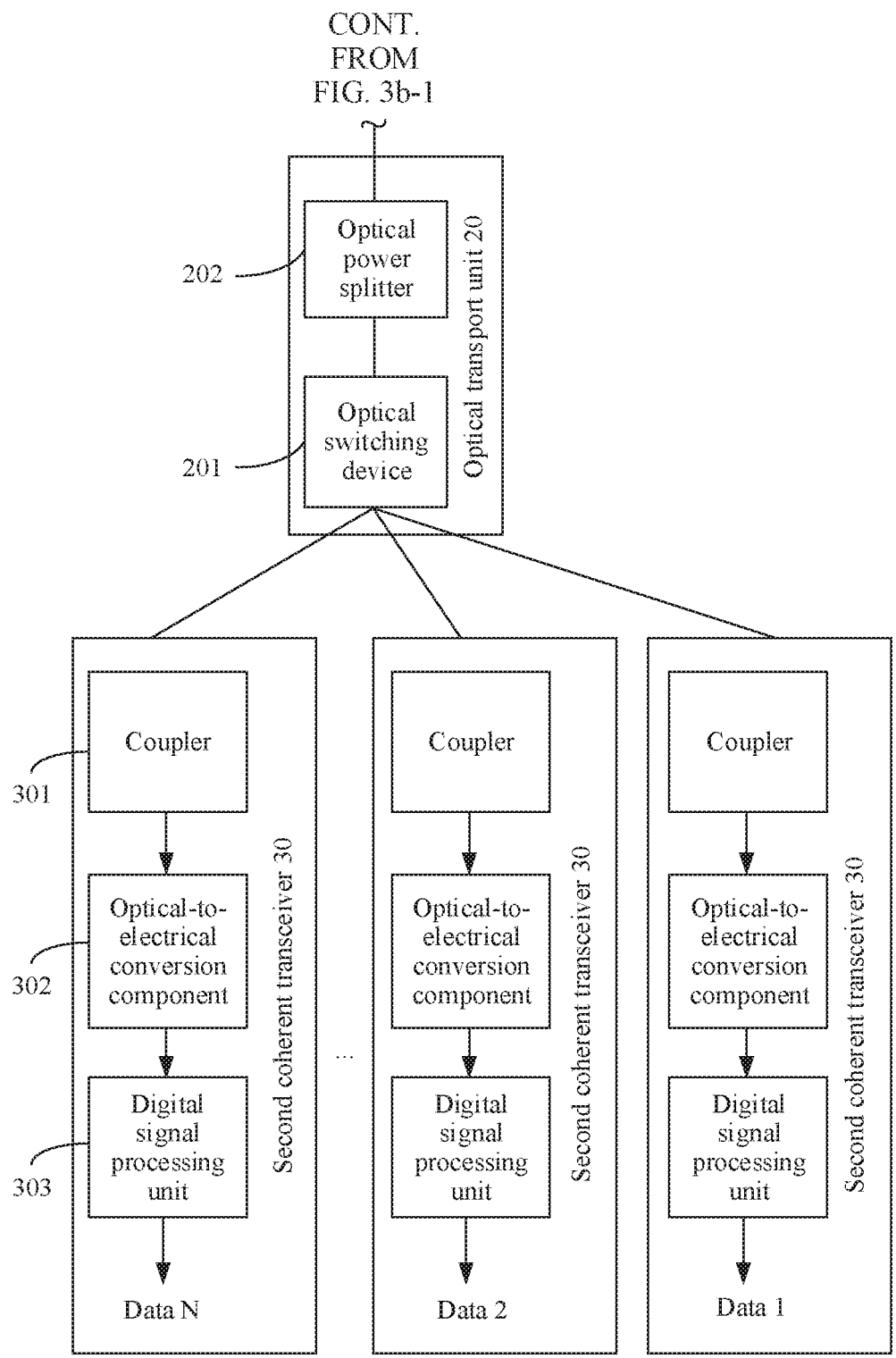

It should be noted that, in this embodiment of the present invention, the optical transport unit 20 includes but is not limited to the optical switching device 201 shown in FIG. 3A and FIG. 3B. As shown in FIG. 3a-1 and FIG. 3a-2, the optical transport unit 20 may alternatively be a unit including an optical power splitter 202. As shown in FIG. 3b-1 and FIG. 3b-2, the optical transport unit 20 may alternatively be a unit including an optical switching device 201 and an optical power splitter 202. In other words, the optical switching device 201 and the optical power splitter 202 are cascaded together to form the optical transport unit 20.

The optical power splitter 202 simply performs optical splitting on the wavelength division multiplexing signal, and simply makes a plurality of copies of the wavelength division multiplexing signal, and cannot operate an optical spectrum in the wavelength division multiplexing signal. For example, the optical power splitter 202 may be configured to make a plurality of copies of the first wavelength division multiplexing signal, where each copy has a different power. To be specific, the optical power splitter 202 may replicate the wavelength division multiplexing signal including the N first optical signal to obtain the N second optical signals including the N first optical signals, where each signal has a different power. Specifically, for a working principle and an implementation process of the optical power splitter 202, refer to the prior art. Details are not described herein.

For example, two second optical signals are obtained after the wavelength division multiplexing signal $S(t)=A_s(t)(\exp^{(jw''_{s1}t+j\theta_{s1})}+\exp^{(jw'_{s2}t+j\theta_{s2})})$ is processed by the optical power splitter 202:

$S_1(t)=B_{s1}(t)(\exp^{(jw''_{s1}t+j\theta_{s1})}+\exp^{(jw'_{s2}t+j\theta_{s2})})$ and $S_2(t)=B_{s2}(t)(\exp^{(jw''_{s1}1+j\theta_{s1})}+\exp^{(jw'_{s2}t+j\theta_{s2})})$, where $B_{s1}$, is a power of one second optical signal, $B_{s2}$ is a power of the other second optical signal, and the two powers are different.

In this case, any one of the optical transport units 20 shown in FIG. 34 and FIG. 3B, FIG. 4a, and FIG. 4b may be configured to transmit the wavelength division multiplexing signal, improving signal transmission flexibility and facilitating deployment of the optical signal transmission system.

Specifically, as shown in FIG. 3A and FIG. 3B, each second coherent transceiver 30 may include a coupler 301, an optical-to-electrical conversion component 302, and a digital signal processing unit 303. The optical-to-electrical conversion component 302 may include a plurality of photoelectric detectors (photodiode, PD), and a quantity of the photoelectric detectors depends on a quantity of signals output by the coupler 301. Generally, the quantity of the photoelectric detectors is less than or equal to the quantity of the signals output by the coupler 301. For example, the optical-to-electrical conversion component 302 may include one photoelectric detector, two photoelectric detectors, or three photoelectric detectors.

Specifically, the coupler 301 included in the second coherent transceiver may be configured to couple local oscillator light to a second optical signal received by the $i^{th}$ second coherent transceiver, to generate at least one coupled optical signal for output.

The second optical signal may carry information included in downlink data corresponding to the second coherent transceiver 30, or may carry information included in a plurality of channels of downlink data. That is, the second optical signal may be a single optical signal, or may be a combined signal including a plurality of optical signals. Specifically, a type of the second optical signal may be determined based on a processing capability of the optical transport unit 20. For example, when the optical transport unit 20 is the optical switching device shown in FIG. 3A and FIG. 3B, the second optical signal is a single optical signal. When the optical transport unit 20 is the optical power splitter 202 shown in FIG. 4a, the second optical signal may include the N first optical signals.

The second optical signal may include a sub-signal in the first polarization state and a sub-signal in the second polarization state. Because all information included in the downlink data is carried in each polarization state, regardless of a signal in any polarization state received by the second coherent transceiver 30, complete information included in the downlink data may be obtained through demodulation. To be specific, coupling the local oscillator light to the second optical signal output by the optical transport unit 20 may be coupling the local oscillator light to a signal in the first polarization state in the second optical signal, or coupling the local oscillator light to a signal in the second polarization state in the second optical signal, with no need to receive signals in different polarization states by using a polarization beam splitter. Specifically, for a working principle and an implementation process of the coupler 301, refer to the prior art. Details are not described herein.

For example, a second optical signal $S(t)=A_s(t)\exp^{(jw''_{s1}t+j\theta_{s1})}$ corresponding to the 1$^{st}$ channel of downlink data and a second optical signal $S(t)=A_s(t)\exp^{(jw'_{s2}t+j\theta_{s2})}$ corresponding to the 2$^{nd}$ channel of downlink data are generated after the first optical signal $S(t)=A_s(t)(\exp^{(jw''_{s1}t+j\theta_{s1})}+\exp^{(jw''_{s2}t+j\theta_{s2})})$ that carries information included in the 1$^{st}$ channel of downlink data and information included in the 2$^{nd}$ channel of downlink data is processed by the optical transport unit 20. Assuming that the second coherent transceiver 30 receives the second optical signal corresponding to the 1$^{st}$ channel of downlink data, the second coherent transceiver 30 may couple the second optical signal $S(t)=A_s(t)\exp^{(jw''_{s1}t+j\theta_{s1})}$ to the local oscillator light.

Figure 5A:
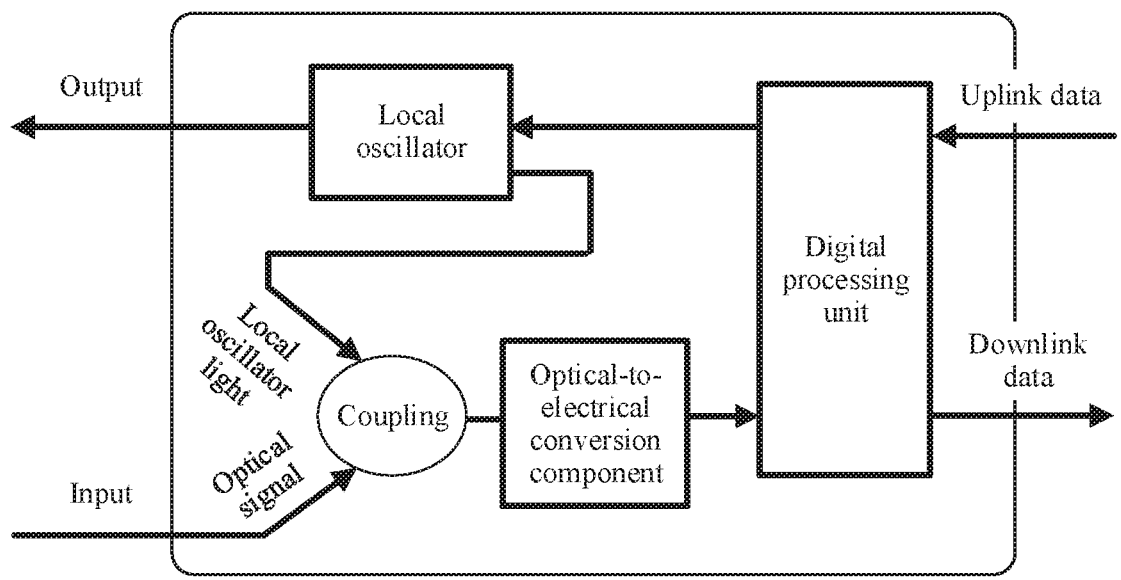
FIG. 5a is a schematic composition diagram of a second coherent transceiver according to an embodiment of the present invention.
Figure 5B:
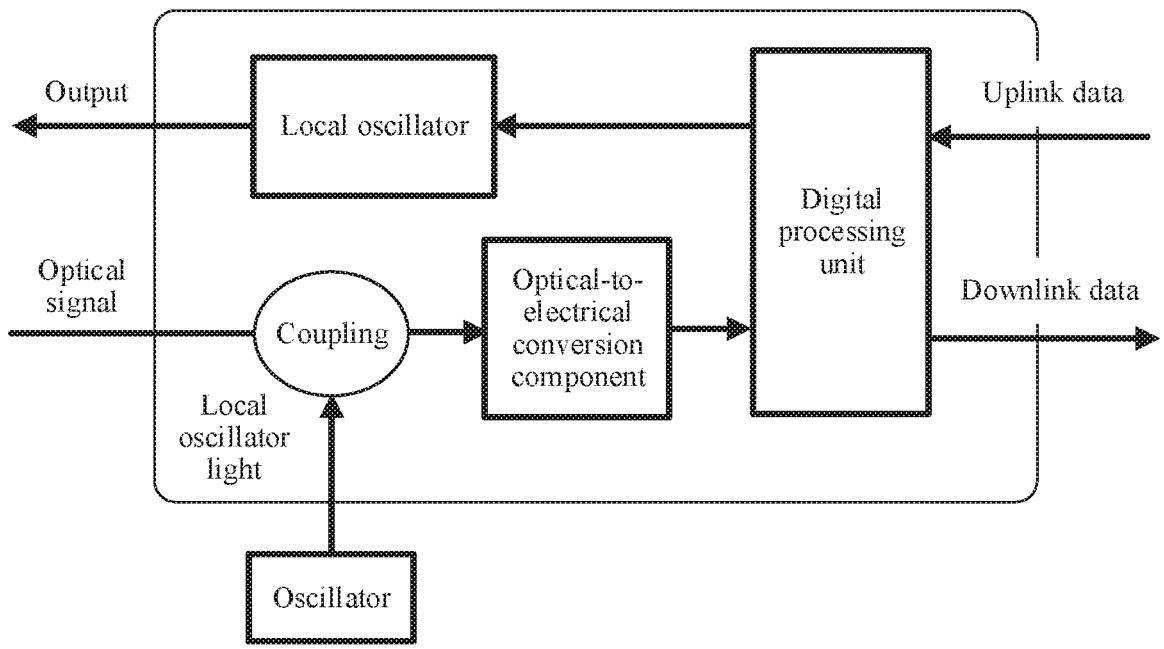
FIG. 5b is a schematic composition diagram of a second coherent transceiver according to an embodiment of the present invention.

The local oscillator light may be light generated by an external independent light source outside the second coherent transceiver 30, or may be light generated by a local oscillator included in the second coherent transceiver 30, for example, light generated by a double-side electro-absorption modulated laser (double-side electro-absorption modulated laser, DS-EML). For example, FIG. 5a is a simplified schematic diagram of the second coherent transceiver 30. As shown in FIG. 5a, a transmit laser used when uplink data is sent is used as a local oscillator (local oscillator, LO) to generate the local oscillator light required by the coupler 301. FIG. 5b is another simplified schematic diagram of the second coherent transceiver 30. As shown in FIG. 5b, an oscillator is disposed outside the second coherent coupler 301 to generate the local oscillator light required by the coupler 301.

The optical-to-electrical conversion component 302 included in the second coherent transceiver may be configured to perform optical-to-electrical conversion on the at least one coupled optical signal output by the coupler 301, to generate at least one electrical signal for output.

The performing optical-to-electrical conversion on the coupled optical signal may be converting the coupled optical signal into an electrical signal. Specifically, for a working process of optical-to-electrical conversion, refer to the prior art. Details are not described herein.

The digital signal processing unit 303 included in the i$^{th}$ second coherent transceiver may be configured to perform digital signal processing on the at least one electrical signal output by the optical-to-electrical conversion component 302, to obtain, through demodulation, the information in the downlink data carried in the i$^{th}$ second optical signal.

Figure 5C:
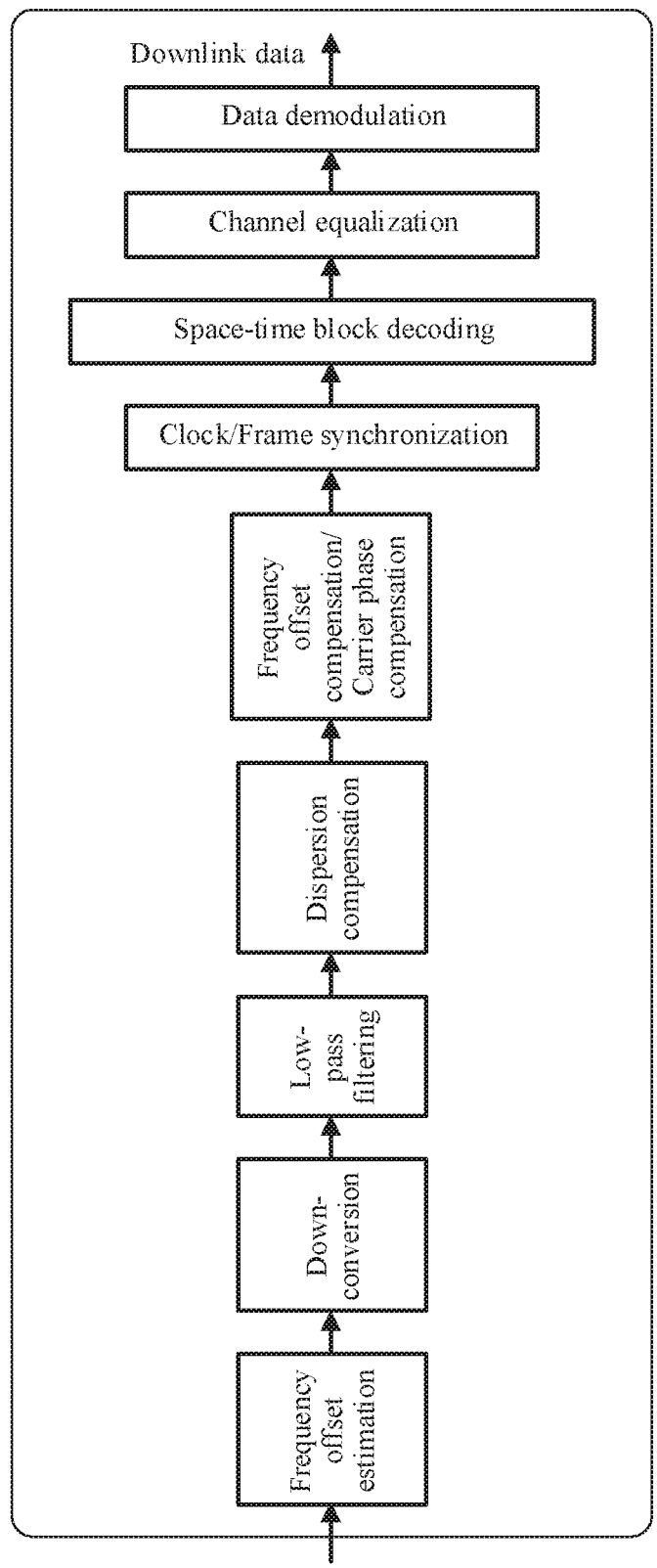
FIG. 5c is a schematic diagram of digital signal processing according to an embodiment of the present invention.

For the digital signal processing process, refer to the prior art. As shown in FIG. 5c, the digital signal processing unit 303 may be configured to perform the following processing: Frequency offset estimation and signal down-conversion are performed, to restore in-phase (in phase) information and quadrature-phase (quadrature phase) information; then, low-pass filtering is performed, to remove out-of-band noise (for example, remove beat noise and a direct current component); next, dispersion compensation and frequency offset compensation/carrier phase compensation are performed in sequence; and finally, a clock/frame synchronization operation, space-time block decoding, channel equalization, and data demodulation are performed, to restore the information included in the downlink data.

It should be noted that, when the second optical signal carries information included in the plurality of channels of downlink data, an electrical-domain filter may be added at the digital processing unit, to separate the downlink data in the signal obtained through coupling and optical-to-electrical conversion, and only information in the downlink data corresponding to the second coherent transceiver 30 is obtained through demodulation.

For example, a coherent transceiver 1 receives downlink data 1, and a coherent transceiver 2 receives only downlink data 2. Assuming that the optical power splitter 202 sends, to the coherent transceiver 1, a signal that carries the downlink data 1 and the downlink data 2, the coherent transceiver 1 performs coupling and optical-to-electrical electrical conversion processing on the signal, and transmits a processed signal to the digital processing unit; and the digital processing unit separates the downlink data 1 from the downlink data 2, so that the coherent transceiver 1 receives only the downlink data 1.

Figure 6A:
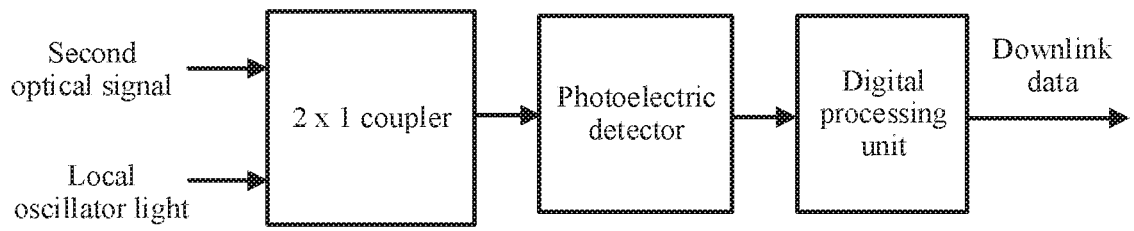
FIG. 6a is a schematic composition diagram of a second coherent transceiver including a 2×1 coupler according to an embodiment of the present invention.

Optionally, the coupler 301 is a 2×1 coupler shown in FIG. 6a. The 2×1 coupler may mean that the coupler has two input ports and one output port. In this embodiment of the present invention, one of the two input ports is configured to receive the second optical signal output by the optical transport unit 20, the other input port is configured to receive the local oscillator light, and the output port is configured to output one coupled optical signal. In this case, the optical-to-electrical conversion component 302 includes one photoelectric detector. The photoelectric detector is mainly configured to convert the optical signal into an electrical signal. For working principles of the 2×1 coupler and the photoelectric detector, refer to the prior art. Details are not described herein.

For example, assuming that the second optical signal is $E_s(t)$, and the local oscillator signal is $E_{LO}(t)$, one coupled optical signal output after the two signals passes through the 2×1 coupler shown in FIG. 6a is $$E_1(t) = \frac{E_S(t)+E_{LO}(t)}{\sqrt{2}} \text{ or } E_1(t) = \frac{E_S(t)-E_{LO}(t)}{\sqrt{2}}.$$

Assuming that the coupled optical signal is $$E_1(t) = \frac{E_S(t)+E_{LO}(t)}{\sqrt{2}},$$

an electrical signal generated by performing optical-to-electrical conversion on the coupled optical signal is:

$$i_1(t) \propto E_1(t)E_1^*(t),$$
$$\propto R\left\{\frac{A_s(t)\exp^{(jw''_{s1}t+j\theta_{s1})}+A_{LO}(t)\exp^{(jw_{LO}t+j\theta_{LO})}}{\sqrt{2}}\right\}$$
$$\propto A_s^2(t)+A_{LO}^2(t)+2\sqrt{A_sA_{LO}}\cos(w_{IF}(t)+\theta_{s1}(t)-\theta_{LO}(t))$$

where $E_s(t)$ is $S(t)=A_s(t)\exp^{(jw'_{s2}t+j\theta_{s2})}$, $E_{LO}(t)$ is the local oscillator light $A_{LO}(t)\exp^{(jw_{LO}t+j\theta_{LO})}$, $A_{LO}$ is an amplitude of the local oscillator light, $w_{LO}$ is a frequency of the local oscillator light, $\theta_{LO}$ is a phase of the local oscillator light, $A_s^2(t)$ is the beat noise $A_{LO}^2(t)$ is the direct current component, $w_{1F}(t)$ is a difference between a frequency of the second signal light and the frequency of the local oscillator light, and R is a response depth of the photoelectric detector.

Figure 6B:
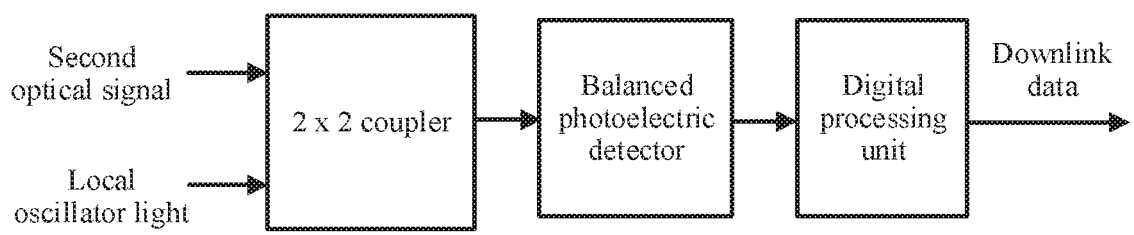
FIG. 6b is a schematic composition diagram of a second coherent transceiver including a 2×2 coupler according to an embodiment of the present invention.
Figure 6C:
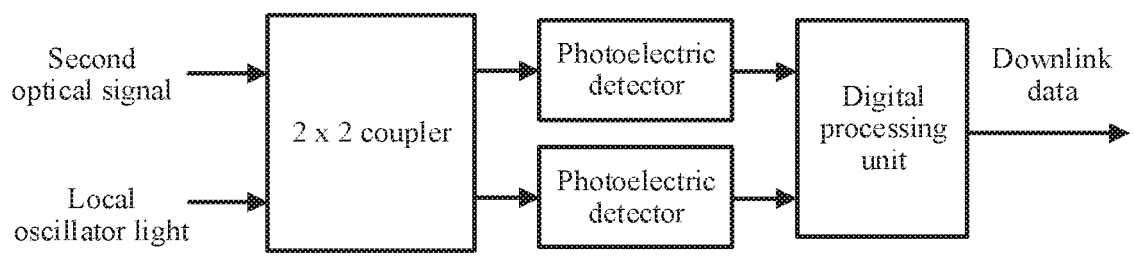
FIG. 6c is a schematic composition diagram of a second coherent transceiver including a 2×2 coupler according to an embodiment of the present invention.

The coupler 301 may alternatively be a 2×2 coupler shown in FIG. 6b or FIG. 6c. The 2×2 coupler may mean that the coupler has two input ports and two output ports. In this embodiment of the present invention, one of the two input ports is configured to receive the second optical signal output by the optical transport unit 20, the other input port is configured to receive the local oscillator light, and the two output ports are configured to output two coupled optical signals. In this case, the optical-to-electrical conversion component 302 may include one balanced photoelectric detector shown in FIG. 6b or two photoelectric detectors shown in FIG. 6c. Specifically, for working principles of the 2×2 coupler and the balanced photoelectric detector, refer to the prior art. Details are not described herein.

For example, assuming that the second optical signal is $E_s$, and the local oscillator signal is $E_L$, two coupled optical signals output after the two signals pass through the 2×2 coupler 301 shown in FIG. 6b or FIG. 6c are $$E_1(t) = \frac{E_S(t) + E_{LO}(t)}{\sqrt{2}} \text{ and } E_2(t) = \frac{E_S(t) - E_{LO}(t)}{\sqrt{2}}.$$

An electrical signal obtained after the two coupled optical signals pass through the balanced photoelectric detector shown in FIG. 6b is:

$$i(t) =$$
$$i_1(t) - i_2(t) \propto \left(A_s^2(t) + A_{LO}^2(t) + 2\sqrt{A_s A_{LO}} \cos(w_{IF}(t) + \theta_{s1}(t) - \theta_{LO}(t))\right) -$$
$$\left(A_s^2(t) + A_{LO}^2(t) - 2\sqrt{A_s A_{LO}} \cos(w_{IF}(t) + \theta_{s1}(t) - \theta_{LO}(t))\right) \propto$$
$$\sqrt{A_s A_{LO}} \cos(w_{IF}(t) + \theta_{s1}(t) - \theta_{LO}(t)).$$

Electrical signals obtained after the two coupled optical signals correspondingly pass through the two photoelectric detectors shown in FIG. 6b are $i_1(t) \propto A_s^2(t) + A_{LO}^2(t) + 2\sqrt{A_s A_{LO}} \cos(w_{1F}(t) + \theta_{s1}(t) - \theta_{LO}(t))$ and $i_2(t) \propto A_s^2(t) + A_{LO}^2(t) - 2\sqrt{A_s A_{LO}} \cos(w_{1F}(t) + \theta_{s1}(t) - \theta_{LO}(t))$, respectively.

It can be learned from the foregoing that, when the second coherent transceiver includes the balanced photoelectric detector, the balanced photoelectric detector can remove the beat noise and the direct current noise from the electrical signal. In this case, when the digital processing unit performs digital processing, the low-pass filtering process in FIG. 5c may be removed.

Figure 6D:
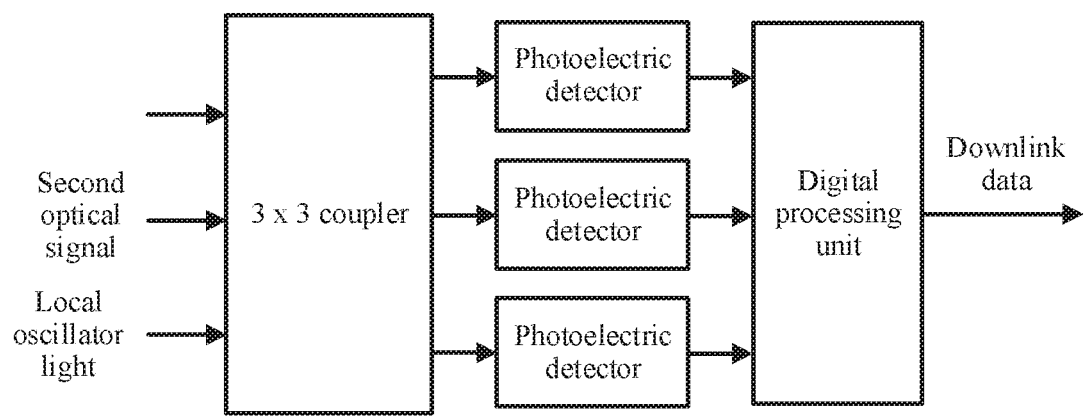
FIG. 6d is a schematic composition diagram of a second coherent transceiver including a 3×3 coupler according to an embodiment of the present invention.

The coupler 301 may alternatively be a 3×3 coupler shown in FIG. 6d. The 3×3 coupler is a conventional 3×3 coupler, and has three input ports and three output ports. In this embodiment of the present invention, any two of the three input ports of the 3×3 coupler may be configured to receive the second optical signal output by the optical transport unit 20 and the local oscillator light, respectively, the remaining input port is set to zero (for example, the input port is grounded), and the three output ports are configured to output three coupled optical signals. A power ratio of the optical signals output from the three output ports is 1:1:1. In this case, the optical-to-electrical conversion component 302 of the second coherent transceiver 30 may include three photoelectric detectors. Specifically, for working principles of the 3×3 coupler and the photoelectric detectors, refer to the prior art. Details are not described herein.

For example, assuming that the second optical signal is $E_s$, and the local oscillator signal is $E_L$, three electrical signals respectively output after the two signals are processed by the 3×3 coupler and the three photoelectric detectors are:

$I_1=|a|^2|E_s|^2+|b|^2|E_L|^2+2Re(ab^*E^*_L E_s)$.

$I_2=|b|^2|E_s|^2+|b|^2|E_L|^2+2Re(|b|^2 E^*_L E_s)$, and $I_3=|b|^2|E_s|^2+|a|^2|E_L|^2+2Re(ba^*E^*_L E_s)$, where
  $a=2/3 \exp(jkl)+1/3 \exp(-j2kl)$, $b=1/3 \exp(-j2kl)-1/3 \exp(jkl)$, and $kl=2\pi/9$; and the in-phase information $I_1$ and the quadrature-phase information $I_Q$ of the downlink data that may be restored after digital signal processing is performed on the three electrical signals are:

$I_1=I_2-0.5I_3=|E_s||E_L|\cos \varphi$, and $I_Q=\sqrt{3}/2(I_3-I_1)=|E_s||E_L|\sin \varphi$.

Figure 6E:
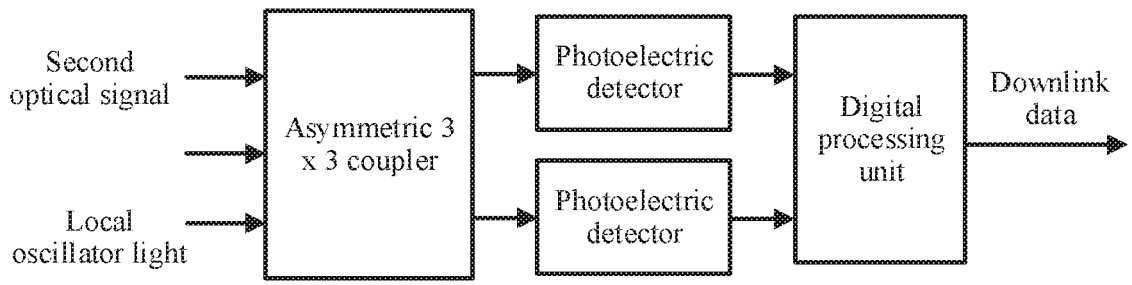
FIG. 6e is a schematic composition diagram of a second coherent transceiver including an asymmetric 3×3 coupler according to an embodiment of the present invention.

The coupler 301 may alternatively be an asymmetric 3×3 coupler shown in FIG. 6e. The asymmetric 3×3 coupler has three input ports and three output ports, and a power ratio of optical signals output by the three output ports is 1:2:2. In this embodiment of the present invention, a first input port and a third input port in the three input ports of the asymmetric. 3×3 coupler may be configured to receive the second optical signal output by the optical transport unit 20 and the local oscillator light, respectively, the remaining input port is set to zero (for example, the input port is grounded), and a first output port and a second output port are configured to output two coupled optical signals. In this case, the optical-to-electrical conversion component 302 of the second coherent transceiver 30 may include two photoelectric detectors. Specifically, for working principles of the 3×3 coupler and the photoelectric detectors, refer to the prior art. Details are not described herein.

For example, assuming that the second optical signal is E, and the local oscillator signal is $E_T$, two electrical signals respectively output after the two signals are processed by the asymmetric 3×3 coupler and the two photoelectric detectors are:

$$I_I = \frac{1}{5}|E_s|^2 + \frac{2}{5}|E_L|^2 + \frac{2\sqrt{2}}{5}\text{Re}(E_L * E_s), \text{ and}$$

$$I_Q = \frac{2}{5}|E_s|^2 + \frac{1}{5}|E_L|^2 - \frac{2\sqrt{2}}{5}\text{Im}(E_L * E_s).$$

It should be noted that, in addition to the units shown above, the optical signal transmission system may include other units such as a pre-emphasis unit and a dispersion pre-compensation unit. This is not limited.

In addition, in a communication process, in an inverse process of transmitting the downlink data, the optical signal transmission system in this embodiment of the present invention may further be configured to transmit uplink data and process the uplink data. It may be understood that, transmitting the uplink data may be the inverse process of transmitting the downlink data, or may be different from downlink data transmission to some extent.

For example, the N second coherent transceivers 30 may further be configured to modulate N channels of uplink data, to generate N third optical signals for output. The $j^{th}$ third optical signal carries all information included in the $j^{th}$ channel of uplink data, and j is an integer greater than or equal to 1 and less than or equal to N.

The optical transport unit 20 may further be configured to: receive the N third optical signals sent by the N second coherent transceivers, and perform transmission processing on the N third optical signals, to generate a second wavelength division multiplexing signal for output. The second wavelength division multiplexing signal includes the N third optical signals, and the N third optical signals each have a different frequency.

The first coherent transceiver 10 may further be configured to: receive the second wavelength division multiplexing signal output by the optical transport unit 20, and obtain, through digital signal processing, information in uplink data carried in the N third optical signals.

Specifically, the second coherent transceiver in the N second coherent transceivers is specifically configured to modulate a light source of the $j^{th}$ second coherent transceiver with the $j^{th}$ channel of uplink data, to generate the $j^{th}$ third optical signal for output. For the modulation process, refer to the prior art. Details are not described herein.

The following describes, with reference to the foregoing optical signal transmission system, in detail an optical signal transmission method according to an embodiment of the present invention. An optical signal transmission system in the following method embodiment may correspondingly include the components shown in FIG. 3A and FIG. 3B, FIG. 3a-1 and FIG. 3a-2, and FIG. 3b-1 and FIG. 3b-2. It should be noted that, although a logical sequence is shown in the following method flowchart, in some cases, the shown or described steps may be performed in a sequence different from the sequence herein.

Figure 7:
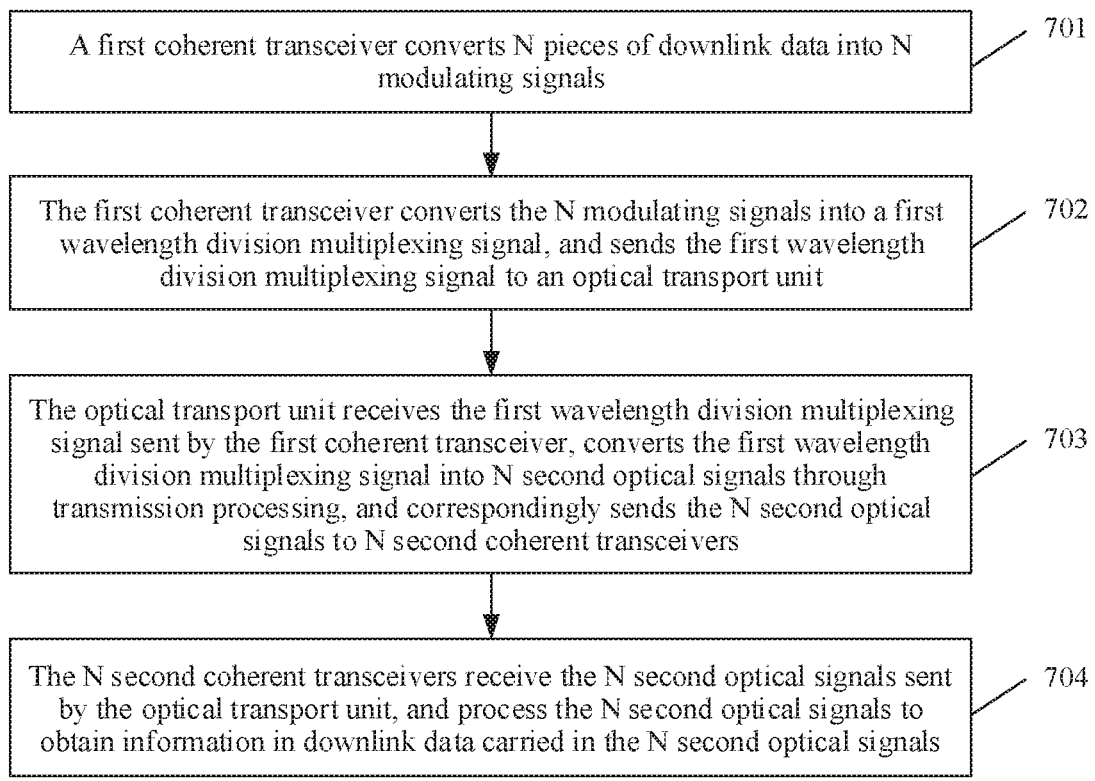
FIG. 7 is a schematic flowchart of an optical signal transmission method according to an embodiment of the present invention.

FIG. 7 shows an optical signal transmission method according to an embodiment of the present invention. The method may be applied to the optical signal transmission system in the foregoing embodiments. The optical signal transmission system may include a first coherent transceiver, an optical transport unit, and N second coherent transceivers. As shown in FIG. 7, the method may include the following steps.

Step 701: The first coherent transceiver converts N channels of downlink data into N modulating signals.

The N modulating signals each have a different frequency, one of the N modulating signals includes a first sub-signal in a first polarization state and a second sub-signal in a second polarization state, the first polarization state is orthogonal to the second polarization state, and the first sub-signal and the second sub-signal carry all information included in downlink data corresponding to the modulating signal.

For the process in Which the first coherent transceiver converts the N channels of downlink data into the N modulating signals, refer to the related descriptions in the foregoing embodiments. Details are not described again.

Step 702: The first coherent transceiver converts the N modulating signals into a first wavelength division multiplexing signal, and sends the first wavelength division multiplexing signal to the optical transport unit.

The first wavelength division multiplexing signal may include N first optical signals, and the N first optical signals correspond to the N modulating signals. To be specific, the first optical signals are obtained by performing digital-to-analog conversion and coherent modulation on the modulating signals.

Step 703: The optical transport unit receives the first wavelength division multiplexing signal sent by the first coherent transceiver, converts the first wavelength division multiplexing signal into N second optical signals through transmission processing, and correspondingly sends the N second optical signals to the N second coherent transceivers.

The converting, by the optical transport unit, the first wavelength division multiplexing signal into N second optical signals through transmission processing may include:

splitting, by the optical transport unit, the N first optical signals included in the first wavelength division multiplexing signal into the N second optical signals, where the N first optical signals correspond to the N second optical signals; or replicating, by the optical transport unit, the first wavelength division multiplexing signal to obtain the N second optical signals, where each second optical signal has a different power, and each second optical signal includes the N first optical signals, that is, each second optical signal carries information in the N channels of downlink data carried in the N first optical signals.

Step 704: The N second coherent transceivers receive the N second optical signals sent by the optical transport unit, and process the N second optical signals to obtain information in downlink data carried in the N second optical signals.

The $i^{th}$ second coherent transceiver processes the $i^{th}$ second optical signal to obtain information in downlink data carried in the $i^{th}$ second optical signal, and i is an integer greater than or equal to 1 and less than or equal to N.

For the process in which the N second coherent transceivers process the N second optical signals to obtain the information in the downlink data carried in the N second optical signals, refer to the related descriptions in the foregoing embodiments. Details are not described herein again.

Compared with the prior art, in the optical signal transmission method according to this embodiment of the present invention, a coherent transceiver at a central office end performs space-time block coding on downlink data. Coded downlink data is modulated into different polarization states, and a signal in each polarization state carries all information included in the downlink data. In this way, after a space-time coded signal is sent to a coherent transceiver at a peer end after coherent modulation, the coherent transceiver at the peer end can receive an optical signal in any polarization state, and perform coupling and digital signal processing on the optical signal to obtain information carried in the signal, with no need to design a polarization beam splitter at a coherent transceiver at a receive end, reducing design costs of the coherent transceiver at the receive end.

Optionally, the first coherent transceiver includes N groups of processing units, a combiner unit, a digital-to-analog converter, and a coherent modulator. The N groups of processing units correspond to the N channels of downlink data, and each group of processing units include a symbol modulation unit, a space-time block coding unit, and a frequency domain modulation unit and the converting, by the first coherent transceiver, the N channels of downlink data into modulating signals specifically includes:

performing, by the N groups of processing units, symbol modulation, space-time block coding, and frequency domain modulation on the N channels of downlink data, respectively, to generate the N modulating signals for output, where the group of processing units perform symbol modulation, space-time block coding processing, and frequency domain modulation on the $i^{th}$ channel of downlink data, to generate the $i^{th}$ modulating signal for output.

The group of processing units include a symbol modulation unit, a space-time block coding unit, and a frequency domain modulation unit, and the performing, by the $i^{th}$ group of processing units, symbol modulation, space-time block coding processing, and frequency domain modulation on the channel of downlink data, to generate the $i^{th}$ modulating signal for output specifically includes:

performing, by the symbol modulation unit, symbol modulation on the downlink data, to generate a signal including at least one symbol for output; performing, by the space-time block coding unit, polarized and time-dimensional space-time coding on the signal output by the symbol modulation unit, to generate a space-time coded signal for output; performing, by the frequency domain modulation unit, frequency domain modulation on the space-time coded signal output by the space-time block coding unit, to generate one modulating signal for output.

The converting, by the first coherent transceiver, the N modulating signals into a first wavelength division multiplexing signal specifically includes: combining, by a combiner unit, the N modulating signals output by the N groups of processing units, to generate a combined signal for output; performing, by a digital-to-analog converter, digital-to-analog conversion on the combined signal output by the combiner unit, to generate an analog signal for output; and performing, by a coherent modulator by using a first optical carrier, coherent modulation on the analog signal output by the digital-to-analog converter, to generate the first wavelength division multiplexing signal for output.

Optionally, the $i^{th}$ second coherent transceiver includes a coupler, an optical-to-electrical conversion component, and a digital processing unit, and the processing, by the second coherent transceiver, the second optical signal to obtain information in downlink data carried in the $i^{th}$ second optical signal specifically includes:

coupling, by the coupler, local oscillator light to the $i^{th}$ second optical signal received by the $i^{th}$ second coherent transceiver, to generate at least one coupled optical signal for output; performing, by the optical-to-electrical conversion component, optical-to-electrical conversion on the at least one coupled optical signal output by the coupler, to generate at least one electrical signal for output; and performing, by the digital signal processing unit, digital signal processing on the at least one electrical signal output by the optical-to-electrical conversion component, to obtain, through demodulation, the information in the downlink data carried in the $i^{th}$ second optical signal.

Optionally, the coupler and the optical-to-electrical conversion component used in this method embodiment are as follows:

the coupler is a 2×1 coupler, and the optical-to-electrical conversion component includes one photoelectric detector;

the coupler is a 2×2 coupler, and the optical-to-electrical conversion component includes one balanced photoelectric detector or two photoelectric detectors;

the coupler is a 3×3 coupler, and the optical-to-electrical conversion component includes three photoelectric detectors; or the coupler is an asymmetric 3×3 coupler, and the optical-to-electrical conversion component includes two photoelectric detectors.

Optionally, the second coherent transceiver further includes a local oscillator laser. The local oscillator laser is configured to generate the local oscillator light and serve as a light source of the $i^{th}$ second coherent transceiver, or the local oscillator light is generated by a local oscillator outside the second coherent transceiver.

Optionally, the optical transport unit includes an optical switching device, an optical power splitter, or an optical switching device and an optical power splitter.

In a communication process, in an inverse process of transmitting the downlink data, the optical signal transmission method in this embodiment of the present invention may further include transmitting uplink data and processing the uplink data. It may be understood that, transmitting the uplink data may be the inverse process of transmitting the downlink data, or may be different from downlink data transmission to some extent. Specifically, the method further includes:

modulating, by the N second coherent transceivers, N channels of uplink data, to generate N third optical signals for output, where the $j^{th}$ third optical signal carries all information included in the $j^{th}$ channel of uplink data, and j is an integer greater than or equal to 1 and less than or equal to N;

receiving, by the optical transport unit, the N third optical signals sent by the N second coherent transceivers, and performing transmission processing on the N third optical signals, to generate a second wavelength division multiplexing signal for output, where the second wavelength division multiplexing signal includes the N third optical signals, and the N third optical signals each have a different frequency; and receiving, by the first coherent transceiver, the second wavelength division multiplexing signal output by the optical transport unit, and obtaining, through digital signal processing, information in uplink data carried in the N third optical signals.

The modulating, by the $j^{th}$ second coherent transceiver in the N second coherent transceivers, the $j^{th}$ channel of uplink data, to generate the $j^{th}$ third optical signal for output specifically includes:

modulating, by the $j^{th}$ second coherent transceiver, the light source of the $j^{th}$ second coherent transceiver with the $j^{th}$ channel of uplink data, to generate the $j^{th}$ third optical signal for output.

It may be understood that, for some specific or extended descriptions in the method in this embodiment, reference may be made to the descriptions in the foregoing embodiment. Details are not described again.

The following describes in detail the foregoing optical signal transmission method by using an example in which the first coherent transceiver sends downlink data 1, downlink data 2, and downlink data 3, the optical transport unit is the optical switching device, a second coherent transceiver 1 demodulates the downlink data 1, a second coherent transceiver 2 demodulates the downlink data 2, and a third coherent transceiver 3 demodulates the downlink data 3.

The first coherent transceiver performs symbol modulation, space-time block coding, and frequency domain modulation on the downlink data 1, the downlink data 2, and the downlink data 3, to obtain a modulating signal 1, a modulating signal 2, and a modulating signal 3. Each modulating signal has a different frequency. Each modulating signal includes signals in two polarization states that are orthogonal to each other, signals in two polarization states in the modulating signal 1 separately carry all information included in the downlink data 1, signals in two polarization states in the modulating signal 2 separately carry all information included in the downlink data 2, and signals in two polarization states in the modulating signal 3 separately carry all information included in the downlink data 3.

Then, the first coherent transceiver performs combination, digital-to-analog conversion, and coherent modulation processing on the modulating signal 1, the modulating signal 2, and the modulating signal 3, to obtain a wavelength division multiplexing signal including three first optical signals and output the wavelength division multiplexing signal. The three first optical signals are a first optical signal 1 corresponding to the modulating signal 1, a first optical signal 2 corresponding to the modulating signal 2, and a first optical signal 3 corresponding to the modulating signal 3. The first optical signal 1 carries all information included in the downlink data 1, the first optical signal 2 carries all information included in the downlink data 2, and the first optical signal 3 carries all information included in the downlink data 3.

The optical switching device receives the wavelength division multiplexing signal, splits the wavelength division multiplexing signal into three second optical signals, and correspondingly sends the three second optical signals to the three second coherent transceivers. The three second optical signals are a second optical signal 1 corresponding to the first optical signal 1, a second optical signal 2 corresponding to the first optical signal 2, and a second optical signal 3 corresponding to the first optical signal 3. The second optical signal 1 carries all the information included in the downlink data 1, the second optical signal 2 carries all the information included in the downlink data 2, and the second optical signal 3 carries all the information included in the downlink data 3.

The second coherent transceiver 1 receives the second optical signal 1, and performs coupling, optical-to-electrical conversion, and digital signal processing on the second optical signal 1, to obtain, through demodulation, the information included in the downlink data 1 carried in the second optical signal 1.

The second coherent transceiver 2 receives the second optical signal 2, and performs coupling, optical-to-electrical conversion, and digital signal processing on the second optical signal 2, to obtain, through demodulation, the information included in the downlink data 2 carried in the second optical signal 2.

The second coherent transceiver 3 receives the second optical signal 3, and performs coupling, optical-to-electrical conversion, and digital signal processing on the second optical signal 3, to obtain, through demodulation, the information included in the downlink data 3 carried in the second optical signal 3.

The following describes in detail the foregoing optical signal transmission method by using an example in which the first coherent transceiver sends downlink data 1, downlink data 2, and downlink data 3, the optical transport unit is the optical power splitter, a second coherent transceiver 1 demodulates the downlink data 1, a second coherent transceiver 2 demodulates the downlink data 2, and a third coherent transceiver 3 demodulates the downlink data 3.

The first coherent transceiver performs symbol modulation, space-time block coding, and frequency domain modulation on the downlink data 1, the downlink data 2, and the downlink data 3, to obtain a modulating signal 1, a modulating signal 2, and a modulating signal 3. Each modulating signal has a different frequency. Each modulating signal includes signals in two polarization states that are orthogonal to each other, signals in two polarization states in the modulating signal 1 separately carry all information included in the downlink data 1, signals in two polarization states in the modulating signal 2 separately carry all information included in the downlink data 2, and signals in two polarization states in the modulating signal 3 separately carry all information included in the downlink data.

Then, the first coherent transceiver performs combination, digital-to-analog conversion, and coherent modulation processing on the modulating signal 1, the modulating signal 2, and the modulating signal 3, to obtain a wavelength division multiplexing signal including three first optical signals and Output the wavelength division multiplexing signal. The three first optical signals are a first optical signal 1 corresponding to the modulating signal 1, a first optical signal 2 corresponding to the modulating signal 2, and a first optical signal 3 corresponding to the modulating signal 3. The first optical signal 1 carries all information included in the downlink data 1, the first optical signal 2 carries all information included in the downlink data 2, and the first optical signal 3 carries all information included in the downlink data 3.

The optical power splitter receives the wavelength division multiplexing signal, splits the wavelength division multiplexing signal into three second optical signals, and correspondingly sends the three second optical signals to the three second coherent transceivers. The three second optical signals are a second optical signal 1, a second optical signal 2, and a second optical signal 3. The second optical signal 1 carries all information included in each of the downlink data 1, the downlink data 2, and the downlink data 3; the second optical signal 2 carries all the information included in each of the downlink data 1, the downlink data 2, and the downlink data 3; and the second optical signal 3 carries all the information included in each of the downlink data 1, the downlink data 2, and the downlink data 3.

The second coherent transceiver 1 receives the second optical signal 1, performs coupling and optical-to-electrical conversion processing on the second optical signal 1 to obtain an electrical signal, obtains, through filtering in electrical domain, a signal that carries only the downlink data 1, and performs digital signal processing on the signal obtained through filtering, to obtain, through demodulation, the information included in the downlink data 1.

The second coherent transceiver 2 receives the second optical signal 2, performs coupling and optical-to-electrical conversion processing on the second optical signal 2 to obtain an electrical signal, obtains, through filtering in electrical domain, a signal that carries only the downlink data 2, and performs digital signal processing on the signal obtained through filtering, to obtain, through demodulation, the information included in the downlink data 2.

The second coherent transceiver 3 receives the second optical signal 3, performs coupling and optical-to-electrical conversion processing on the second optical signal 3 to obtain an electrical signal, obtains, through filtering in electrical domain, a signal that carries only the downlink data 3, and performs digital signal processing on the signal obtained through filtering, to obtain, through demodulation, the information included in the downlink data 3.

For the foregoing filtering manner in the electrical domain, refer to the prior art. Details are not described herein.

The foregoing descriptions about implementations allow a person skilled in the art to clearly understand that, for the purpose of convenient and brief description, division of the foregoing function modules is merely used as an example for illustration. In actual application, the foregoing functions can be allocated to different modules and implemented as required, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division, or may be other division during actual implementation. For example, a plurality of units or components may be combined or integrated into another apparatus, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of the embodiments.

In addition, function units in the embodiments of the present invention may be integrated into one processing unit, or each of the units may exist alone physically, or two or more units may be integrated into one unit. The integrated unit may be implemented in the form of hardware, or may be implemented in the form of a software function unit.

When the integrated unit is implemented in the form of a software function unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. An optical signal transmission system, comprising: a first coherent transceiver, an optical transporter, and N second coherent transceivers, wherein
the first coherent transceiver is configured to convert N channels of downlink data into N modulating signals, wherein the N modulating signals each has a different frequency, one of the N modulating signals comprises a first sub-signal in a first polarization state and a second sub-signal in a second polarization state, the first polarization state is orthogonal to the second polarization state, and each of the first sub-signal and the second sub-signal carries information comprised in downlink data corresponding to the modulating signal;
the first coherent transceiver is further configured to: convert the N modulating signals into a first wavelength division multiplexing signal, and send the first wavelength division multiplexing signal to the optical transporter, wherein the first wavelength division multiplexing signal comprises N first optical signals, and the N first optical signals correspond to the N modulating signals;
the optical transporter is configured to: receive the first wavelength division multiplexing signal sent by the first coherent transceiver, convert the first wavelength division multiplexing signal into N second optical signals through transmission processing, and correspondingly send the N second optical signals to the N second coherent transceivers; and
the N second coherent transceivers are configured to: receive the N second optical signals sent by the optical transporter, and process the N second optical signals to obtain information in downlink data carried in the N second optical signals, wherein the $i^{th}$ second coherent transceiver is configured to process the $i^{th}$ second optical signal to obtain information in downlink data carried in the $i^{th}$ second optical signal, and i is an integer greater than or equal to 1 and less than or equal to N.

2. The optical signal transmission system according to claim 1, wherein the first coherent transceiver comprises:
N groups of processors, configured to perform symbol modulation, space-time block coding, and frequency domain modulation on the N channels of downlink data, respectively, to generate the N modulating signals, wherein the $i^{th}$ group of processors are configured to perform symbol modulation, space-time block coding processing, and frequency domain modulation on the $i^{th}$ channel of downlink data, to generate the $i^{th}$ modulating signal.

3. The optical signal transmission system according to claim 2, wherein the $i^{th}$ group of processors is configured to:
perform symbol modulation on the $i^{th}$ channel of downlink data, to generate a signal output comprising at least one symbol;
perform polarized and time-dimensional space-time coding on the signal output comprising the at least one symbol output, to generate a space-time coded signal output; and
perform frequency domain modulation on the space-time coded signal output, to generate the $i^{th}$ modulating signal.

4. The optical signal transmission system according to claim 2, wherein the first coherent transceiver further comprises:
a combiner, configured to combine the N modulating signals output by the N groups of processors, to generate a combined signal output;
a digital-to-analog converter, configured to perform digital-to-analog conversion on the combined signal output, to generate an analog signal output; and
a coherent modulator, configured to perform, by using a first optical carrier, coherent modulation on the analog signal output, to generate the first wavelength division multiplexing signal output.

5. The optical signal transmission system according to claim 1, wherein the $i^{th}$ second coherent transceiver comprises:
a coupler, configured to couple local oscillator light to the $i^{th}$ second optical signal received by the $i^{th}$ second coherent transceiver, to generate at least one coupled optical signal output;
an optical-to-electrical convertor, configured to perform optical-to-electrical conversion on the at least one coupled optical signal output, to generate at least one electrical signal output; and
a digital signal processor, configured to perform digital signal processing on the at least one electrical signal output, to obtain, through demodulation, the information in the downlink data carried in the $i^{th}$ second optical signal.

6. The optical signal transmission system according to claim 5, wherein
the coupler is a 2×1 coupler, and the optical-to-electrical convertor comprises one photoelectric detector;
the coupler is a 2×2 coupler, and the optical-to-electrical convertor comprises one balanced photoelectric detector or two photoelectric detectors;
the coupler is a 3×3 coupler, and the optical-to-electrical convertor comprises three photoelectric detectors; or
the coupler is an asymmetric 3×3 coupler, and the optical-to-electrical convertor comprises two photoelectric detectors.

7. The optical signal transmission system according to claim 5, wherein
the $i^{th}$ second coherent transceiver further comprises a local oscillator laser, wherein the local oscillator laser is configured to generate the local oscillator light and serve as a light source of the $i^{th}$ second coherent transceiver, or
the local oscillator light is generated by a local oscillator outside the $i^{th}$ second coherent transceiver.

8. The optical signal transmission system according to claim 1, wherein
the optical transporter comprises at least one of an optical switcher, or an optical power splitter.

9. The optical signal transmission system according to claim 1, wherein
the N second coherent transceivers are further configured to modulate N channels of uplink data, to generate N third optical signals, wherein the $j^{th}$ third optical signal carries information comprised in the $j^{th}$ channel of uplink data, and j is an integer greater than or equal to 1 and less than or equal to N;
the optical transporter is further configured to: receive the N third optical signals sent by the N second coherent transceivers, and perform transmission processing on the N third optical signals, to generate a second wavelength division multiplexing signal, wherein the second wavelength division multiplexing signal comprises the N third optical signals, and the N third optical signals each has a different frequency; and
the first coherent transceiver is further configured to: receive the second wavelength division multiplexing signal, and obtain, through digital signal processing, information in uplink data carried in the N third optical signals.

10. The optical signal transmission system according to claim 9, wherein
the $j^{th}$ second coherent transceiver in the N second coherent transceivers is configured to modulate a light source of the $j^{th}$ second coherent transceiver with the $j^{th}$ channel of uplink data, to generate the $j^{th}$ third optical signal.

11. An optical signal transmission method, wherein the method is applied to an optical signal transmission system, the optical signal transmission system comprises a first coherent transceiver, an optical transporter, and N second coherent transceivers, and the method comprises:
converting, by the first coherent transceiver, N channels of downlink data into N modulating signals, wherein the N modulating signals each has a different frequency, one of the N modulating signals comprises a first sub-signal in a first polarization state and a second sub-signal in a second polarization state, the first polarization state is orthogonal to the second polarization state, and each of the first sub-signal and the second sub-signal carries information comprised in downlink data corresponding to the modulating signal;
converting, by the first coherent transceiver, the N modulating signals into a first wavelength division multiplexing signal, and sending the first wavelength division multiplexing signal to the optical transporter, wherein the first wavelength division multiplexing signal comprises N first optical signals, and the N first optical signals correspond to the N modulating signals;
receiving, by the optical transporter, the first wavelength division multiplexing signal sent by the first coherent transceiver, converting the first wavelength division multiplexing signal into N second optical signals through transmission processing, and correspondingly sending the N second optical signals to the N second coherent transceivers; and
receiving, by the N second coherent transceivers, the N second optical signals sent by the optical transporter, and processing the N second optical signals to obtain information in downlink data carried in the N second optical signals, wherein the $i^{th}$ second coherent transceiver processes the $i^{th}$ second optical signal to obtain information in downlink data carried in the $i^{th}$ second optical signal, and i is an integer greater than or equal to 1 and less than or equal to N.

12. The optical signal transmission method according to claim 11, wherein the first coherent transceiver comprises N groups of processors, and the converting, by the first coherent transceiver, the N channels of downlink data into modulating signals comprises:
performing, by the N groups of processors, symbol modulation, space-time block coding, and frequency domain modulation on the N channels of downlink data, respectively, to generate the N modulating signals, wherein the $i^{th}$ group of processors perform symbol modulation, space-time block coding processing, and frequency domain modulation on the $i^{th}$ channel of downlink data, to generate the $i^{th}$ modulating signal.

13. The optical signal transmission method according to claim 12, wherein the performing, by the $i^{th}$ group of processors, symbol modulation, space-time block coding processing, and frequency domain modulation on the $i^{th}$ channel of downlink data, to generate the $i^{th}$ modulating signal comprises:
Performing symbol modulation on the $i^{th}$ channel of downlink data, to generate a signal output comprising at least one symbol;
performing polarized and time-dimensional space-time coding on the signal output comprising the at least one symbol, to generate a space-time coded signal output; and
performing frequency domain modulation on the space-time coded signal output, to generate the $i^{th}$ modulating signal.

14. The optical signal transmission method according to claim 12, wherein the first coherent transceiver further comprises a combiner, a digital-to-analog converter, and a coherent modulator, and the converting, by the first coherent transceiver, the N modulating signals into a first wavelength division multiplexing signal comprises:
combining, by the combiner, the N modulating signals output by the N groups of processors, to generate a combined signal output;
performing, by the digital-to-analog converter, digital-to-analog conversion on the combined signal output, to generate an analog signal output; and performing, by the coherent modulator by using a first optical carrier, coherent modulation on the analog signal output, to generate the first wavelength division multiplexing signal output.

15. The optical signal transmission method according to claim 11, wherein the $i^{th}$ second coherent transceiver comprises a coupler, an optical-to-electrical convertor, and a digital signal processor, and the processing, by the $i^{th}$ second coherent transceiver, the $i^{th}$ second optical signal to obtain information in downlink data carried in the $i^{th}$ second optical signal comprises:
    coupling, by the coupler, local oscillator light to the $i^{th}$ second optical signal received by the $i^{th}$ second coherent transceiver, to generate at least one coupled optical signal output;
    performing, by the optical-to-electrical convertor, optical-to-electrical conversion on the at least one coupled optical signal output, to generate at least one electrical signal output; and
    performing, by the digital signal processor, digital signal processing on the at least one electrical signal output, to obtain, through demodulation, the information in the downlink data carried in the $i^{th}$ second optical signal.

16. The optical signal transmission method according to claim 15, wherein
    the coupler is a 2×1 coupler, and the optical-to-electrical convertor comprises one photoelectric detector;
    the coupler is a 2×2 coupler, and the optical-to-electrical convertor comprises one balanced photoelectric detector or two photoelectric detectors;
    the coupler is a 3×3 coupler, and the optical-to-electrical convertor comprises three photoelectric detectors; or
    the coupler is an asymmetric 3×3 coupler, and the optical-to-electrical convertor comprises two photoelectric detectors.

17. The optical signal transmission method according to claim 15, wherein
    the $i^{th}$ second coherent transceiver further comprises a local oscillator laser, wherein the local oscillator laser is configured to generate the local oscillator light and serve as a light source of the $i^{th}$ second coherent transceiver, or
    the local oscillator light is generated by a local oscillator outside the $i^{th}$ second coherent transceiver.

18. The optical signal transmission method according to claim 11, wherein
    the optical transporter comprises at least one of an optical switcher, or an optical power splitter.

19. The optical signal transmission method according to claim 11, wherein the method further comprises:
    modulating, by the N second coherent transceivers, N channels of uplink data, to generate N third optical signals, wherein the $j^{th}$ third optical signal carries information comprised in the $j^{th}$ channel of uplink data, and j is an integer greater than or equal to 1 and less than or equal to N;
    receiving, by the optical transporter, the N third optical signals sent by the N second coherent transceivers, and performing transmission processing on the N third optical signals, to generate a second wavelength division multiplexing signal, wherein the second wavelength division multiplexing signal comprises the N third optical signals, and the N third optical signals each has a different frequency; and
    receiving, by the first coherent transceiver, the second wavelength division multiplexing signal, and obtaining, through digital signal processing, information in uplink data carried in the N third optical signals.

20. The optical signal transmission method according to claim 19, wherein modulating, by the $j^{th}$ second coherent transceiver in the N second coherent transceivers, the $j^{th}$ channel of uplink data, to generate the $j^{th}$ third optical signal comprises:
    modulating, by the $j^{th}$ second coherent transceiver, a light source of the $j^{th}$ second coherent transceiver with the $j^{th}$ channel of uplink data, to generate the $j^{th}$ third optical signal.

* * * * *